(12) United States Patent
Nakata

(10) Patent No.: US 9,100,118 B2
(45) Date of Patent: Aug. 4, 2015

(54) TRANSMISSION DEVICE AND TRANSMISSION SYSTEM

(71) Applicant: FUJITSU LIMITED, Kawasaki-shi, Kanagawa (JP)

(72) Inventor: Masao Nakata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 116 days.

(21) Appl. No.: 14/046,355

(22) Filed: Oct. 4, 2013

(65) Prior Publication Data

US 2014/0126897 A1 May 8, 2014

(30) Foreign Application Priority Data

Nov. 6, 2012 (JP) ................................ 2012-244837

(51) Int. Cl.
*H04B 10/08* (2006.01)
*H04B 10/077* (2013.01)

(52) U.S. Cl.
CPC ........ *H04B 10/0771* (2013.01); *H04B 10/0777* (2013.01)

(58) Field of Classification Search
CPC ........... H04B 10/0771; H04B 10/0777; H04B 10/03; H04B 10/07; H04B 10/0731; H04B 10/0797
USPC ...................................................... 398/1–37
See application file for complete search history.

(56) References Cited

U.S. PATENT DOCUMENTS

| | | | |
|---|---|---|---|
| 6,532,102 B2 * | 3/2003 | Kobayashi et al. | 359/334 |
| 6,937,820 B2 * | 8/2005 | Iwaki et al. | 398/6 |
| 7,113,698 B1 * | 9/2006 | Ryhorchuk et al. | 398/10 |
| 8,483,560 B2 * | 7/2013 | Miyaji | 398/30 |
| 2002/0024690 A1 | 2/2002 | Iwaki et al. | |
| 2008/0205460 A1 | 8/2008 | Okaniwa et al. | |

FOREIGN PATENT DOCUMENTS

| | | |
|---|---|---|
| JP | 2002-77056 | 3/2002 |
| JP | 2007-220977 | 8/2007 |

* cited by examiner

*Primary Examiner* — M. R. Sedighian
(74) *Attorney, Agent, or Firm* — Staas & Halsey LLP

(57) ABSTRACT

A transmission device includes an optical amplifier to amplify an optical main signal to be transmitted on an optical transmission path; a first controller to stop output of the optical amplifier and output of an optical monitor signal to be transmitted on the optical transmission path when a failure of the optical transmission path is detected; a second controller to be switched from the first controller and to operate and stop the output of the optical amplifier and the output of the optical monitor signal when the failure of the optical transmission path is detected; an optical monitor signal transceiver to transmit and receive the optical monitor signal including control information; and a switch to switch an operation from the first controller to the second controller, based on information of the failure of the optical transmission path based on the states of transmission and reception of the optical monitor signal.

15 Claims, 25 Drawing Sheets

FIG. 12
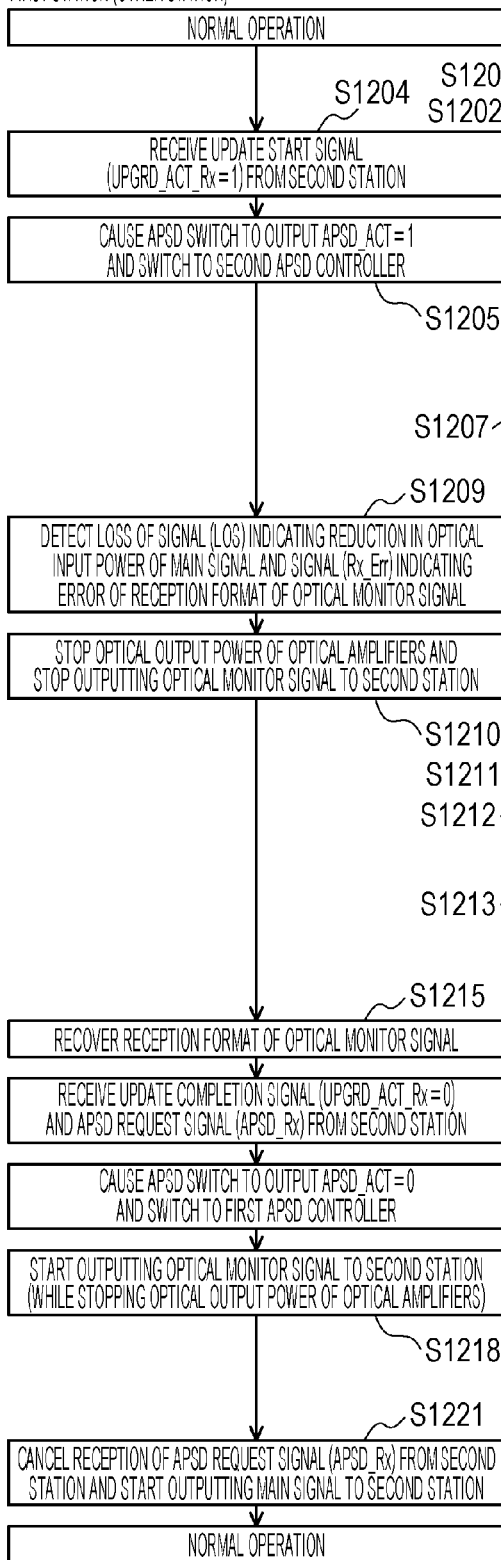
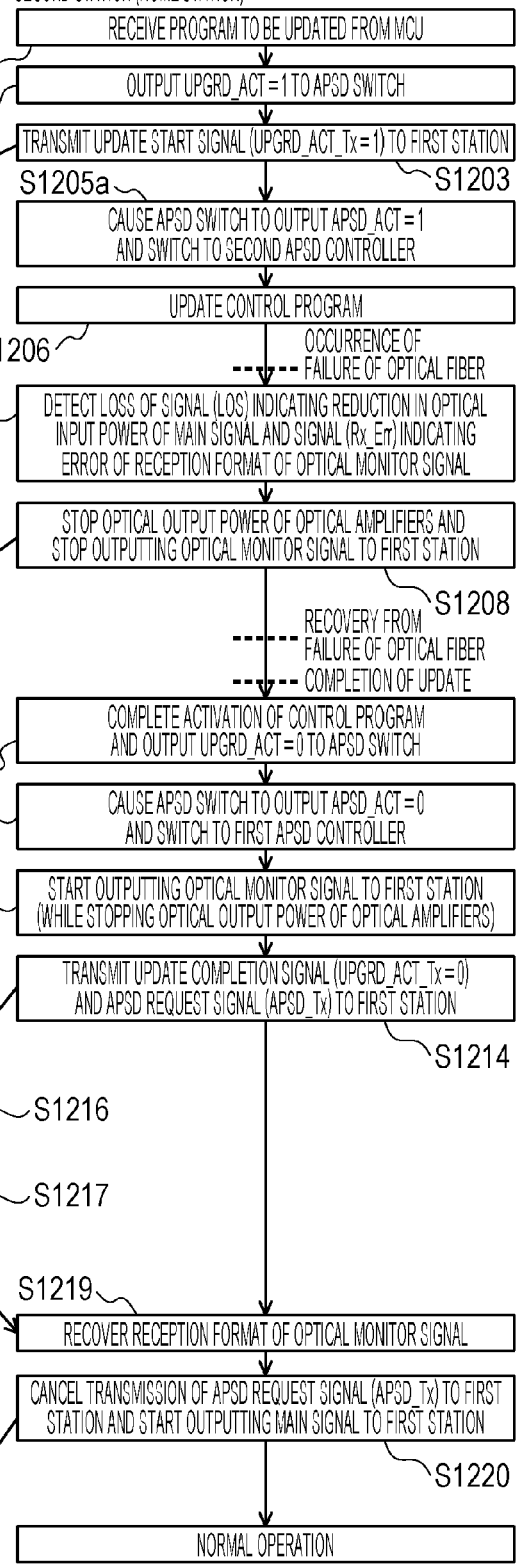

TRANSMISSION DEVICE AND TRANSMISSION SYSTEM

CROSS-REFERENCE TO RELATED APPLICATION

This application is based upon and claims the benefit of priority of the prior Japanese Patent Application No. 2012-244837, filed on Nov. 6, 2012, the entire contents of which are incorporated herein by reference.

FIELD

The embodiments discussed herein are related to a transmission device and a transmission system that handle a failure of a transmission path when a control program of the transmission device is updated and the transmission device is out of order.

BACKGROUND

There are optical transmission systems as signal transmission systems, for example. Among the optical transmission systems, there is a wavelength division multiplexing (WDM) optical transmission system in which a signal is transmitted using an optical signal with a plurality of wavelengths. In an optical transmission system such as the WDM optical transmission system, an optical fiber is used as a transmission path, and multiple transfer devices (relay devices) that amplify optical power of an optical signal transmitted through the optical fiber are arranged in the middle of the transmission path and relay the optical signal at multiple stages. Long-distance transmission is achieved at low cost by using the optical transmission system such as the WDM optical transmission system.

A transmission device includes an optical amplifier for supplying pump light to an erbium-doped fiber (EDF) and an optical amplifier for executing Raman amplification or amplifying the power of the optical signal by supplying laser light for Raman amplification to the laid optical fiber that is used as an amplification medium.

In the optical transmission system, if a failure such as release of an optical fiber connector located near the transmission device or a disconnection of the laid optical fiber occurs, the optical signal may leak from a location at which the failure occurs. In order to minimize an impact, caused by the leakage of the optical signal from the location of the failure of the optical fiber, on a person in charge of maintenance, an optical transmission system that has an automatic power shutdown (APSD) control function of stopping optical output power of an optical amplifier has been proposed (refer to, for example, Japanese Laid-open Patent Publication No. 2002-77056).

In addition, a technique for executing control during the update of a control program of an optical amplifier has been proposed (refer to, for example, Japanese Laid-open Patent Publication No. 2007-220977). According to the technique, during the normal execution of the program, an amplification controller controls an LD driving current and controls amplification of optical power of an optical signal (optical main signal). During the update of the program, the optical amplification is executed by outputting a data signal of a D/A converter from a latch IC so as to cause the LD driving current determined before the update to be output and maintaining the LD driving current at a fixed value. The controller has a function of detecting optical input power. When a detected signal of the optical input power becomes 0 during the update of the program of the amplification controller, the amplification controller stops the optical amplification.

With the aforementioned configuration, the optical amplification is continuously executed with the LD driving current maintained at the fixed value during the update of the program of the amplification controller and may be stopped if a failure occurs in the optical fiber.

SUMMARY

According to an aspect of the invention, a transmission device includes an optical amplifier configured to amplify an optical main signal to be transmitted on an optical transmission path; a first controller configured to stop output of the optical amplifier and output of an optical monitor signal to be transmitted on the optical transmission path when a failure of the optical transmission path is detected; a second controller configured to be switched from the first controller and configured to operate and stop the output of the optical amplifier and the output of the optical monitor signal when the failure of the optical transmission path is detected; an optical monitor signal transceiver configured to transmit and receive the optical monitor signal including control information; and a switch configured to switch an operation from the first controller to the second controller, based on information of the failure of the optical transmission path based on the states of transmission and reception of the optical monitor signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a sequence diagram illustrating a second example of operations of the home station and operations of the other station if a failure occurs during the update, described with reference to FIG. 9, of the program;

DESCRIPTION OF EMBODIMENTS

Figure 1:
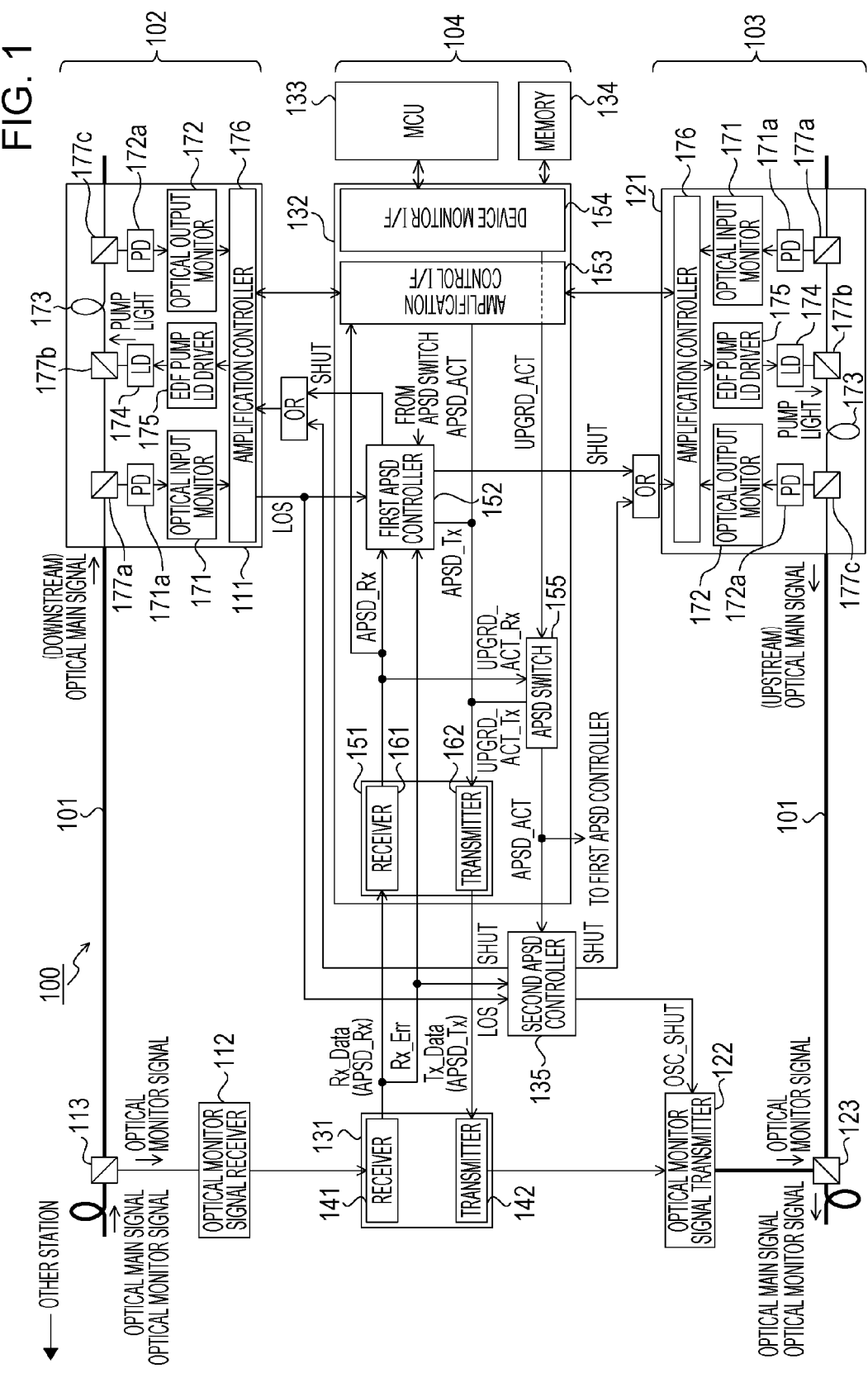
FIG. 1 is a block diagram illustrating a transmission device according to the first embodiment.

It is considered that the conventional techniques has the following problems. During the update of a control program of a home station, control information may not be transmitted and received between the home station and another station through an optical transmission path. In addition, the APSD control function that is included in a controller does not operate. It takes a time of several seconds to several hundreds of seconds to update the program of the controller. Thus, leakage of an optical signal from a location at which a failure occurs in an optical fiber is not stopped within a time defined by a safety standard and may become a risk to a person in charge of maintenance.

Specifically, even if the optical fiber is disconnected during a process of updating the program of the home station, the disconnection may not be detected. Thus, the home station may not inform the other station located on the upstream side of information of the disconnection of the optical fiber through the optical transmission path. Thus, the upstream-side other station may not determine that the optical fiber is disconnected between transmission devices.

In addition, it is assumed that a failure occurs in a downstream optical fiber when the other station updates a program of a controller of an optical amplifier. Based on this assumption, an APSD controller that is included in a controller of an optical amplifier of the home station located on the downstream side of the optical transmission path detects the occurrence of the failure of the optical fiber, stops the optical output power of the optical amplifier, and outputs an APSD request signal to the other station. In this case, since the program of the controller of the other station is out of order, the other station may not receive the APSD request signal and stop the optical output power of an optical amplifier.

A configuration for detecting a reduction in optical input power and stopping optical amplification is considered. If a failure of the downstream optical fiber is detected and the optical amplification is to be stopped, the output of the optical power from the optical amplifier of the home station to the upstream side is stopped, and the optical input power of the optical main signal of the other station becomes 0. Thus, the output of the optical power from the optical amplifier of the other station to the downstream side may be stopped.

However, after that, even when the optical fiber is restored from the failure, the optical amplifiers of the home station and other station stop the optical output power, optical power input to the home station and other station is 0, and the home station and the other station determine the failure of the optical fiber. In order to restore communication of the optical main signal, an operator confirms a connection of the optical fiber, and a procedure of starting control of the optical amplification is executed. Thus, the operator performs a cumbersome task. When the control of the optical amplification is erroneously started during a disconnection of the optical fiber, a person in charge of maintenance, who performs a restoration task, may be irradiated with optical power leaking from a location of the failure.

In addition, the following configuration is considered: a redundant configuration in which a plurality of controllers that have the same control program are arranged and one of the controllers operates during the update of the control program of the other controller. Since the plurality of controllers are arranged, the control programs are updated for the plurality of controllers, an implementation area increases, and a device is large and expensive.

The control information is transmitted and received between the home station and the other station by using an optical monitor signal that is different from the optical main signal on the optical transmission path. It may be considered that the optical monitor signal is not output to the other station during the update of the program of the home station. If the optical monitor signal is not output during the update of the program, the output of the optical monitor signal is stopped regardless of whether or not the optical fiber is disconnected, and the optical main signal is blocked for each time when the program is updated. Thus, this control may not be used.

A transmission device and a transmission system that make it possible that a disconnection of an optical fiber is detected and the optical fiber is restored in a safe and simple manner even when a program of a controller is updated and the controller is out of order, are provided.

Hereinafter, the embodiments of a technique disclosed herein are descried in detail with reference to the accompanying drawings. In the embodiments, control that corresponds to the following items A to C is executed.

A: During the update of a program of a controller (and when the controller is out of order)

A-1: When a failure such as a disconnection of a fiber does not occur, normal transmission is ensured and transmission of an optical main signal on an optical transmission path is ensured.

A-2: If a failure such as a disconnection of the fiber occurs, optical amplification (pump light) is immediately turned off.
B: Time other than the time when the program is updated
B-1: When a failure such as a disconnection of the fiber does not occur, the normal transmission is ensured and transmission of the optical main signal is ensured.
B-2: If a failure such as a disconnection of the fiber occurs, supply of the pump light is immediately stopped and the optical amplification is stopped.
C: After restoration from a failure such as a disconnection of the fiber
C-1: If the program is currently updated, a process of updating the program is completed, a connection is confirmed by the optical monitor signal, and the optical amplification is turned on after the confirmation.
C-2: If the program is not currently updated, the connection is immediately confirmed by the optical monitor signal and the optical amplification is started.

In the embodiments, even if the optical fiber is disconnected when the controller that is included in a transmission device is out of order due to the update of the program of the controller or the like, the failure of the optical fiber is detected by the aforementioned control and an inexpensive and simple configuration. An impact on a person in charge of maintenance due to leakage of an optical signal from a location at which a failure occurs in the optical fiber is minimized by quickly stopping outputting optical power. In addition, after the optical fiber is restored from the failure and the controller restarts normally operating, communication of the optical monitor signal and the optical main signal is automatically restored, and whereby a task for the restoration from the failure is easily performed and an optical signal is inhibited from leaking to an operator who performs the task for the restoration from the failure.

First Embodiment

FIG. 1 is a block diagram illustrating a transmission device according to the first embodiment. The transmission device 100 illustrated in FIG. 1 is an erbium doped fiber amplifier (EDFA) that has optical amplifiers 111 and 121 that each uses an erbium doped fiber (EDF).

The transmission devices 100 are arranged on an optical transmission path (optical fiber) 101 and have a function of a relay that amplifies a transmission signal (optical main signal) on the optical fiber 101. The transmission device 100 includes a receiving unit 102, a transmitting unit 103, and a device control unit 104.

The receiving unit 102 includes the optical amplifier 111, an optical monitor signal receiver 112, and an optical monitor signal splitter 113. The optical amplifier 111 amplifies the downstream optical main signal transmitted through the optical fiber 101. The optical monitor signal receiver 112 extracts a monitor signal from the optical monitor signal transmitted through the optical fiber 101 and receives the monitor signal. The optical monitor signal splitter 113 isolates the optical monitor signal and causes the optical monitor signal to propagate from the optical fiber 101 to the optical monitor signal receiver 112.

The transmitting unit 103 includes the optical amplifier 121, an optical monitor signal transmitter 122, and an optical monitor signal coupler 123. The optical amplifier 121 amplifies the upstream optical main signal and outputs the amplified optical main signal to the optical fiber 101. The optical monitor signal transmitter 122 transmits the optical monitor signal with the monitor signal. The optical monitor signal coupler 123 isolates the optical monitor signal and causes the optical monitor signal to propagate from the optical monitor signal transmitter 122 to the optical fiber 101.

The device control unit 104 includes a framer 131, a controller 132, a processor (micro controller unit (MCU)) 133, a memory 134, and a second controller (second APSD controller 135) that is arranged outside the controller 132.

The framer 131 includes a receiver 141 and a transmitter 142. The receiver 141 converts the optical monitor signal received by the optical monitor signal receiver 112 into received data. The transmitter 142 converts data to be transmitted as the monitor signal into the monitor signal and outputs the monitor signal to the optical monitor signal transmitter 122. The optical monitor signal received by the optical monitor signal receiver 112 and the optical monitor signal transmitted by the optical monitor signal transmitter 122 are transmitted and received to and from another station (another transmission device 100) located on the upstream side of the downstream optical transmission path 101.

In the following description, the other station (opposing station) indicates the other transmission device 100 located adjacent to the transmission device 100 on the upstream side of the downstream optical transmission path 101.

The framer 131 uses, for example, a packet over SONET framer by which data received and to be transmitted are stored in a SONET frame, and thereby generates a signal to be transmitted and received for the monitor signal to be transmitted. If the signal received from the optical monitor signal receiver 112 does not have a frame added thereto, or the format of the signal has an error, the receiver 141 outputs a format error signal (Rx_Err) indicating the error of the received signal.

The controller 132 includes a control information transceiver 151, a first controller (first APSD controller) 152, an amplification control interface (I/F) 153, and a device monitor interface (I/F) 154, and an APSD switch 155.

The control information transceiver 151 functions as an interface with the framer 131 and transmits and receives the monitor signal with control information to and from the other station. The control information transceiver 151 includes a receiver 161 for receiving the monitor signal and a transmitter 162 for transmitting the monitor signal. The monitor signal includes information that is used to calculate target optical output power (such as operating wavelength numbers of the optical amplifiers 111 and 121) of the optical amplifiers 111 and 121. In addition, the monitor signal includes APSD request information that is used to quickly stop the optical output power of the optical amplifiers 111 and 121 arranged on the optical fiber 101. Thus, the monitor signal is used to control the optical amplifiers 111 and 121.

The amplification control I/F 153 functions as an interface with the optical amplifiers 111 and 121. The amplification control I/F 153 sets the target optical output power in the optical amplifiers 111 and 121 on the basis of the control information. The device monitor I/F 154 functions as an interface with the MCU 133 for monitoring and controlling the transmission device 100. The device monitor I/F 154 is the interface with the MCU 133 for monitoring and controlling the transmission device 100 and may inform the MCU 133 of the state of control of the transmission device 100.

When detecting an error of an APSD request signal (APSD_Rx) included in the monitor signal and errors, caused by a failure of the optical fiber or the like, of the optical main signal and monitor signal, the first APSD controller 152 provides a request to stop the optical output power of the optical amplifiers 111 and 121. In this case, the first APSD controller 152 informs the MCU 133 for monitoring and controlling the transmission device 100 of the state of the control of the transmission device 100.

The MCU 133 controls the transmission device 100. The memory 134 stores the control program of the controller 132. The MCU 133 reads the control program to be updated from the memory 134 in order to update the control program of the controller 132 and updates the control program of the controller 132 (first APSD controller 152).

In order to update the control program installed in the controller 132 of the transmission device 100 for the purpose of improving a function of the transmission device 100, the memory 134 receives the control program from the MCU 133 for controlling the transmission device 100 and stores the received control program. After that, the memory 134 receives a request from the MCU 133 and the control program installed in the controller 132 is rewritten.

The optical amplifier 111 includes an optical input monitor 171, an optical output monitor 172, an EDF 173, a pump LD module 174, an EDF pump LD driver 175, an amplification controller 176, PDa 171a and 172a and couplers 177a to 177c.

A part of the optical signal input to the optical amplifier 111 is branched by the coupler 177a and detected by the PD 171a. The optical power of the detected signal part is monitored by the optical input monitor 171. A part of the optical signal to be output from the optical amplifier 111 is branched by the coupler 177c and detected by the PD 172a. The optical power of the detected signal part is monitored by the optical output monitor 172.

The EDF 173 amplifies the optical main signal on the optical fiber 101. The pump LD module 174 supplies pump light to the EDF 173 through the coupler 177b. The EDF pump LD driver 175 drives the pump LD module 174 and controls the power of the pump light. The amplification controller 176 controls the power of the pump light so as to cause the power of the pump light to be equal to the target optical output power received from the controller 132 on the basis of the optical power monitored by the optical input monitor 171 and the optical power monitored by the optical output monitor 172. When the optical input power of the optical main signal is lower than predetermined optical power such as power detected when the optical fiber 101 is disconnected, the amplification controller 176 determines an increase in a loss in the optical fiber 101 and outputs a loss of signal (LOS). The loss of signal (LOS) indicates a reduction in the optical input power of the optical main signal.

Although the optical amplifier 111 that is arranged on the downstream optical transmission path (optical fiber) 101 is described above, the upstream optical amplifier 121 has the same configuration as the optical amplifier 111.

The second APSD controller 135 is arranged outside the controller 132 and operates as an alternative of the first APSD controller 152 arranged in the controller 132. The second APSD controller 135 operates when the controller 132 of the transmission device 100 is out of order. The APSD switch 155 outputs a switch signal (APSD_ACT=1) to the second APSD controller 135 when the APSD request signal (APSD_Tx, APSD_Rx) that is included in the monitor signal may not be transmitted and received. Thus, the second APSD controller 135 operates the alternative of the first APSD controller 152 arranged in the controller 132.

The state in which the controller 132 is out of order means a state during a time period from the time when the control program of the controller 132 starts to be updated to the time when the controller 132 restarts operating after the update.

The controller 132 receives an update start signal (UPGRD_ACT) from the MCU 133 and updates the control program of the controller 132.

Figure 2:
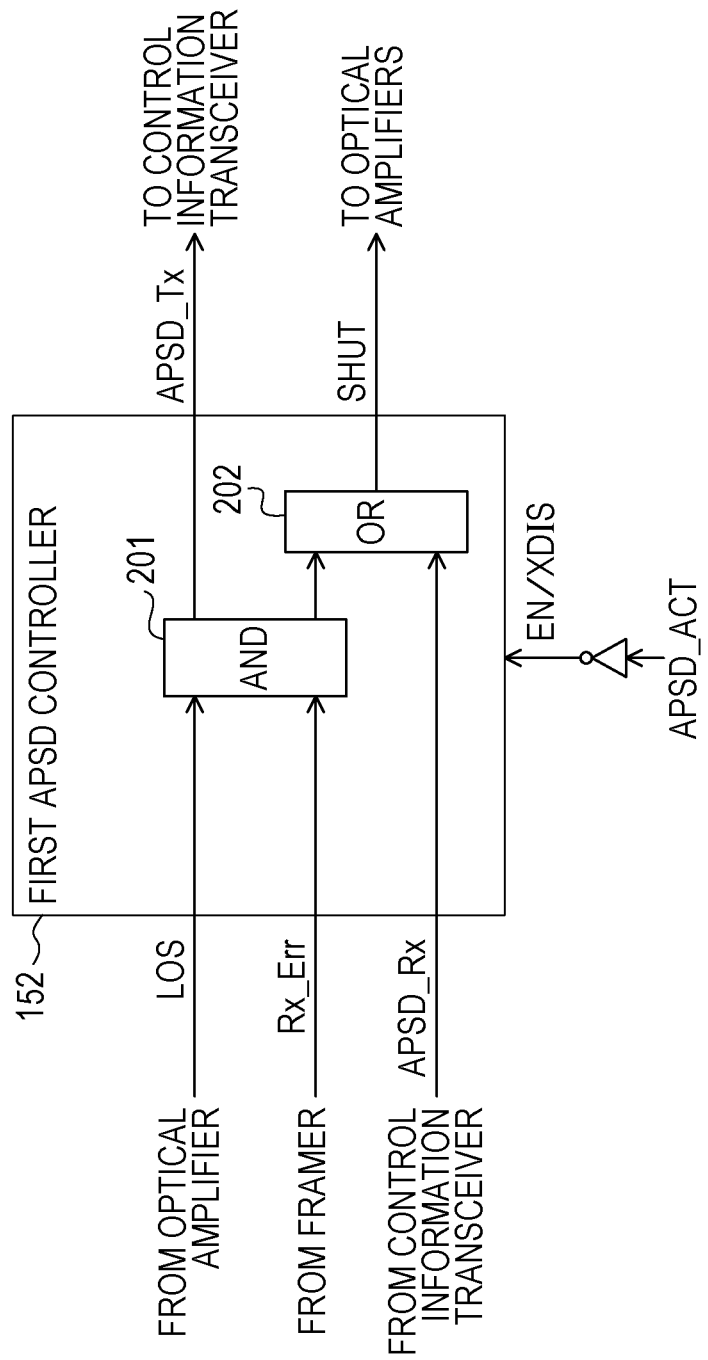
FIG. 2 is a diagram illustrating an example of an internal configuration of a first APSD controller.

FIG. 2 is a diagram illustrating an example of an internal configuration of the first APSD controller. The first APSD controller 152 includes a logical product (AND) circuit 201 and a logical sum (OR) circuit 202. The loss of signal that indicates a reduction in the optical input power of the optical main signal is input to the AND circuit 201 from the optical amplifier 111. The reception format error signal (Rx_Err) is input to the AND circuit 201 from the framer 131. The AND circuit 201 outputs a logical product of the loss of signal and the reception format error signal (Rx_Err) to the OR circuit 202 and outputs the APSD request signal (APSD_Tx) to the control information transceiver 151. The logical product is input to the OR circuit 202 from the AND circuit 201. The APSD request signal (APSD_Rx) is input to the OR circuit 202 from the control information transceiver 151. The OR circuit 202 outputs a logical sum of the logical product and the APSD request signal (APSD_Rx) as a SHUT signal to stop the optical output power to the optical amplifiers 111 and 121.

The first APSD controller 152 operates on the basis of the switch signal (APSD_ACT) output by the APSD switch 155. When the operation of the first APSD controller 152 is valid (EN/XDIS=1), the first APSD controller 152 detects the occurrence of a failure of the optical fiber 101 on the basis of the loss of signal (LOS) indicating a reduction in the optical input power of the optical main signal and the reception format error signal (Rx_Err) indicating the error, detected by the framer 131, of the received signal. If the first APSD controller 152 detects the occurrence of the failure of the optical fiber 101 or receives the APSD request signal (APSD_Rx) included in the monitor signal, the first APSD controller 152 outputs the SHUT signal to stop the optical output power of the optical amplifiers 111 and 121. If the first APSD controller 152 detects the occurrence of the failure of the optical fiber 101, the first APSD controller 152 transmits the APSD request signal (APSD_Tx) to the other station in order to inhibit the optical output power from leaking from the transmission device 100 of the opposing station (other station). If the operation of the first APSD controller 152 is invalid (EN/XDIS=0), the first APSD controller 152 does not operate and output the APSD request signal (APSD_Tx) and the SHUT signal.

Figure 3:
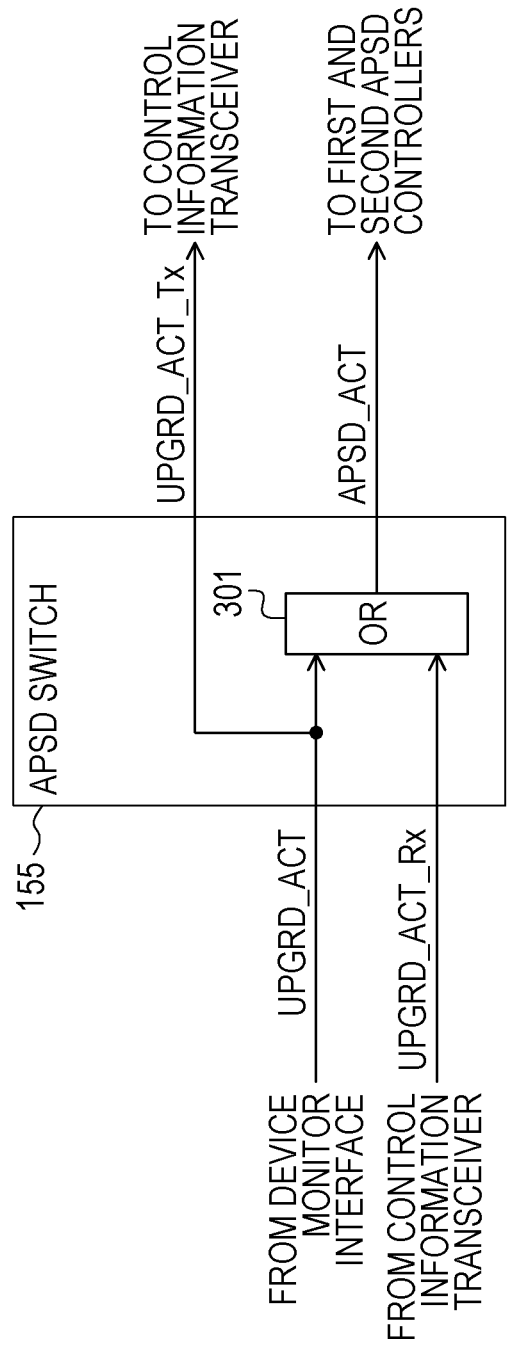
FIG. 3 is a diagram illustrating an example of an internal configuration of an APSD switch.

FIG. 3 is a diagram illustrating an example of an internal configuration of the APSD switch. The APSD switch 155 includes an OR circuit 301. The update start signal (UPGRD_ACT) is input to the OR circuit 301 from the device monitor interface 154. A signal (UPGRD_ACT_Rx) that indicates the start of the update is input to the OR circuit 301 from the control information transceiver 151. The OR circuit 301 outputs a logical sum of the update start signal (UPGRD_ACT) and the signal (UPGRD_ACT_Rx) to the first APSD controller 152 and the second APSD controller 135. In addition, the OR circuit 301 outputs the update start signal (UPGRD_ACT) as a signal (UPGRD_ACT_Tx) indicating the start of the update to the control information transceiver 151.

When receiving the update start signal (UPGRD_ACT=1), the APSD switch 155 outputs a signal (UPGRD_ACT_Tx=1) indicating the start of the update to the transmission device 100 of the other station through the monitor signal. The APSD switch 155 causes the operation of the first APSD controller 152 to be invalid and outputs the switch signal (APSD_ACT=1) to switch the first APSD controller 152 to the second APSD controller 135.

When the transmission device 100 of the other station updates the control program and the signal (UPGRD_

ACT_Rx=1) that indicates the start of the update is received by the home station through the monitor signal, the APSD switch 155 causes the operation of the first APSD controller 152 to be invalid and outputs the switch signal (APSD_ACT=1) to switch the first APSD controller 152 to the second APSD controller 135.

When the program of the controller 132 is completely updated and is activated, a flag value of the signal (UPGRD_ACT) that indicates the start of the update becomes 0. Thus, the APSD switch 155 outputs a signal (UPGRD_ACT_Tx=0) indicating the completion of the update to the transmission device 100 of the other station through the monitor signal. In addition, the APSD switch 155 causes the operation of the second APSD controller 135 to be invalid and outputs the signal (APSD_ACT=0) to cause the first APSD controller 152 to be valid.

When the control program of the transmission device 100 of the other station is completely updated, the APSD switch 155 receives the signal (UPGRD_ACT_Rx=0) indicating the completion of the update through the monitor signal. Thus, the APSD switch 155 causes the operation of the second APSD controller 135 to be invalid and outputs the signal (APSD_ACT=0) to cause the first APSD controller 152 to be valid.

Figure 4:
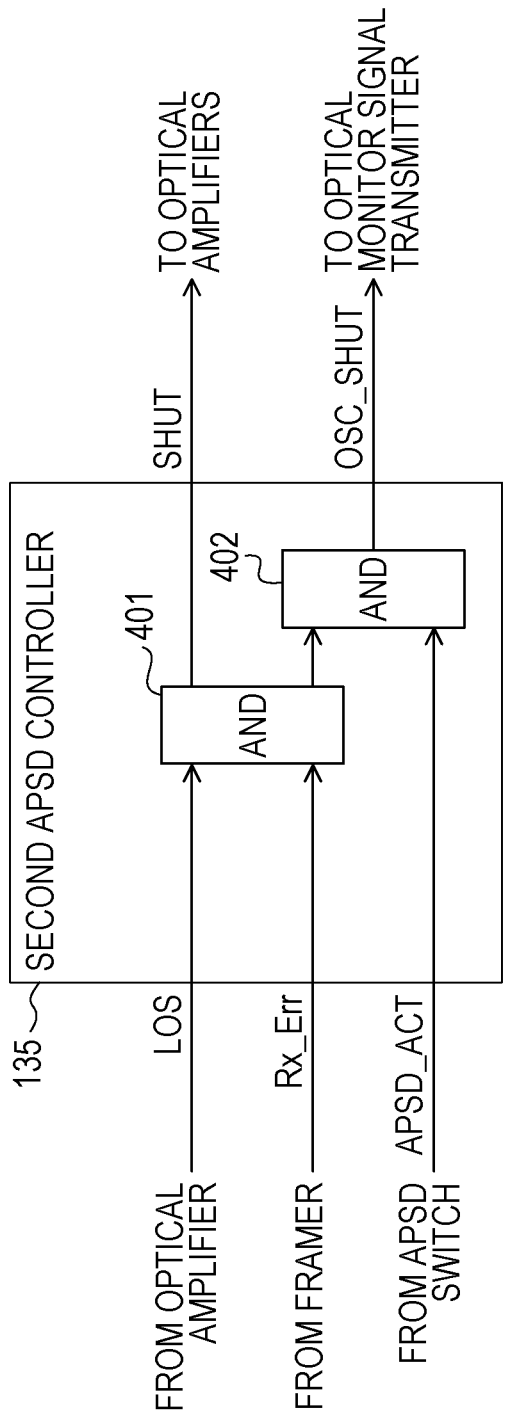
FIG. 4 is a diagram illustrating an example of an internal configuration of a second APSD controller.

FIG. 4 is a diagram illustrating an example of an internal configuration of the second APSD controller. The second APSD controller 135 includes AND circuits 401 and 402. The loss of signal (LOS) that indicates a reduction in the optical output power is input to the AND circuit 401 from the optical amplifier 111. The reception format error signal (Rx_Err) is input to the AND circuit 401 from the framer 131. The AND circuit 401 outputs a logical product of the loss of signal (LOS) and the reception format error signal (Rx_Err) to the AND circuit 402 and outputs the SHUT signal to stop the optical output power to the optical amplifiers 111 and 121. The logical product is input to the AND circuit 402 from the AND circuit 401. The switch signal (APSD_ACT) is input to the AND circuit 402 from the APSD switch 155. The second APSD controller 135 outputs, to the optical monitor signal transmitter 122, a logical product of the logical product received from the AND circuit 401 and the switch signal (APSD_ACT) as an OSC_SHUT signal to stop the output of the optical monitor signal to the transmission device 100 of the other station.

It is assumed that the second APSD controller 135 receives the switch signal (APSD_ACT=1) from the APSD switch 155 arranged in the controller 132 and detects the loss of signal (LOS) indicating a reduction in the optical output power of the optical main signal and the reception format error signal (Rx_Err) indicating the error, detected by the framer 131, of the received signal. Based on this assumption, the second APSD controller 135 outputs the SHUT signal to stop the optical output power of the optical amplifiers 111 and 121 and outputs the OSC_SHUT signal to stop the output of the optical monitor signal.

If a failure occurs in the optical fiber 101, the second APSD controller 135 detects the loss of signal indicating a reduction in the optical input power of the main signal and the reception format error signal indicating the error of the monitor signal and stops the optical output power of the optical amplifiers 111 and 121 and the output of the optical monitor signal to the other station.

The transmission device 100 of the other station receives the update start signal (UPGRD_ACT_Rx=1) through the monitor signal, and the second APSD controller 135 operates and thereby detects the loss of signal indicating the reduction in the optical input power of the main signal and the reception format error signal indicating the error of the monitor signal. Thus, the transmission device 100 of the other station may stop the optical output power even during the update of the control program of the transmission device 100 of the home station.

When the second APSD controller 135 receives the switch signal (APSD_ACT=0) from the APSD switch 155 after the completion of the update of the control program of the controller 132, the operation is switched from the second APSD controller 135 to the first APSD controller 152. Since the second APSD controller 135 receives the switch signal (APSD_ACT=0), the second APSD controller 135 outputs an output stop cancellation signal (OSC_SHUT=0) indicating cancellation of the stop of the output of the optical monitor signal and causes the other station to output the optical monitor signal. In this case, the control of stopping the optical output power of the optical amplifiers 111 and 121 is transferred to the first APSD controller 152. If the first APSD controller 152 continuously detects the loss of signal (LOS) indicating a reduction in the optical input power of the optical main signal and the reception format error signal (Rx_Err) indicating the error of the monitor signal, the first APSD controller 152 outputs a signal (SHUT=1) to stop the optical output power of the optical amplifiers 111 and 121. When the transmission path is restored, the first APSD controller 152 outputs a stop cancellation signal (SHUT=0) indicating the cancellation of the stop of the optical output power of the optical amplifiers 111 and 121.

The first APSD controller 152 illustrated in FIG. 2 receives the loss of signal (LOS) indicating a reduction in the optical input power of the main signal from the optical amplifier 111. The first APSD controller 152 receives the reception format error signal (Rx_Err) indicating the error of the monitor signal from the framer 131. The first APSD controller 152 outputs, to the optical amplifiers 111 and 121, the output stop signal (SHUT) that is a logical signal. The first APSD controller 152 receives and outputs the APSD request signal (APSD_Rx, APSD_Tx) from and to the control information transceiver 151 that processes the control information of the monitor signal. Thus, the first APSD controller 152 has an advanced control function for the operation of the first APSD controller 152.

The second APSD controller 135 (illustrated in FIG. 4) that is arranged outside the controller 132 receives the loss of signal (LOS) and the reception format error signal (Rx_Err). The second APSD controller 135 outputs the SHUT signal to the optical amplifiers 111 and 121 and outputs, to the optical monitor signal transmitter 122, the output stop signal (OSC_SHUT) that is a logical signal. Thus, the second APSD controller 135 may be configured with simple logical circuits at low cost, compared with the first APSD controller 152.

Figure 5:
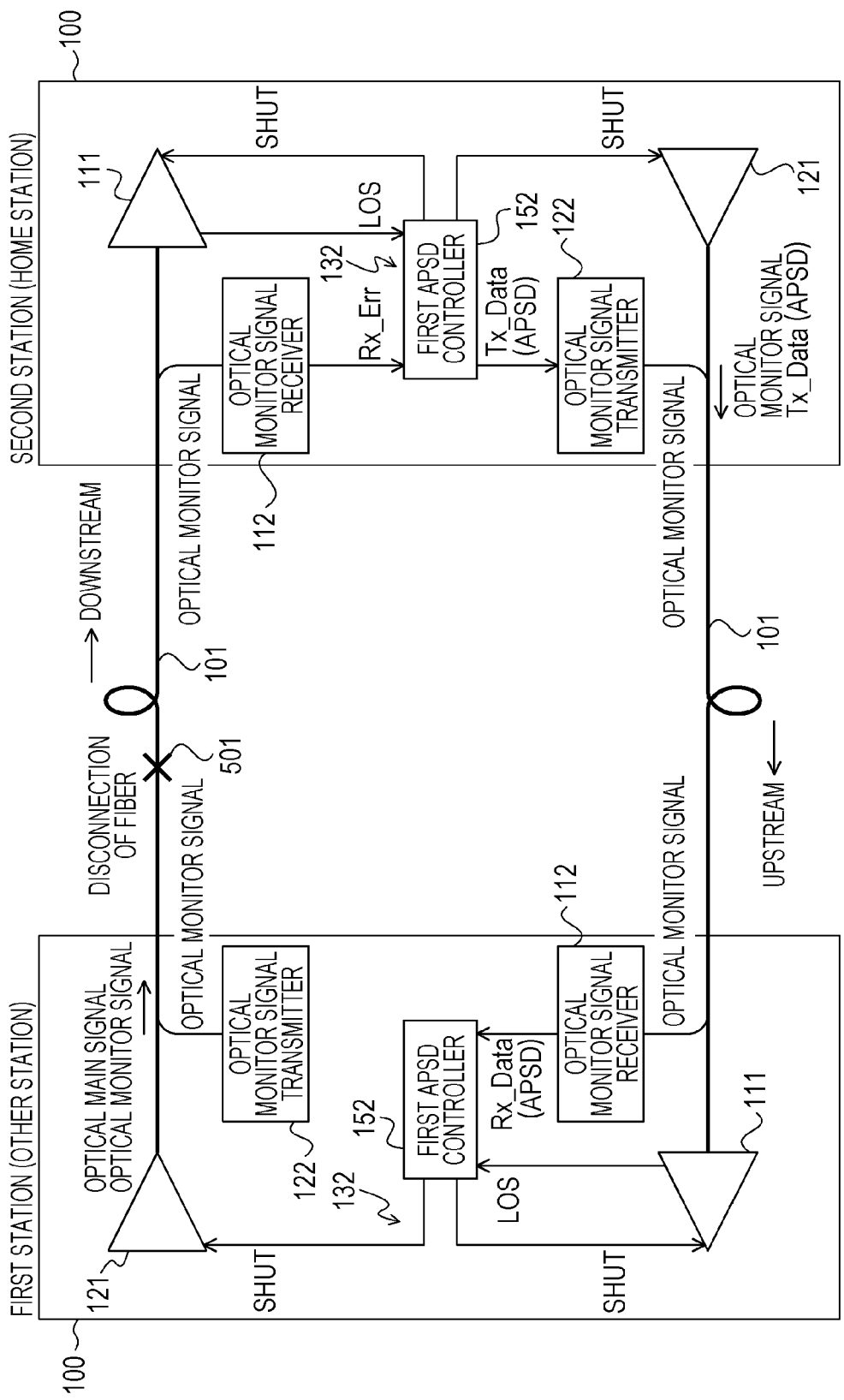
FIG. 5 is a diagram illustrating a state in which a failure occurs in a downstream optical fiber during normal operations of the first APSD controllers of the transmission devices.

Operations to be Executed if Failure Occurs in Optical Fiber During Normal Operation FIG. 5 is a diagram illustrating a state in which a failure occurs in the downstream optical fiber during a normal operation of the controller of the transmission device. It is assumed that the first station (other station) and the second station (home station) normally operate and the first APSD controllers 152 operate. FIG. 5 illustrates the state in which the failure such as a disconnection of the downstream optical fiber 101 between the first station (other station) and the second station (home station) occurs (at a location indicated by reference numeral 501).

Figure 6:
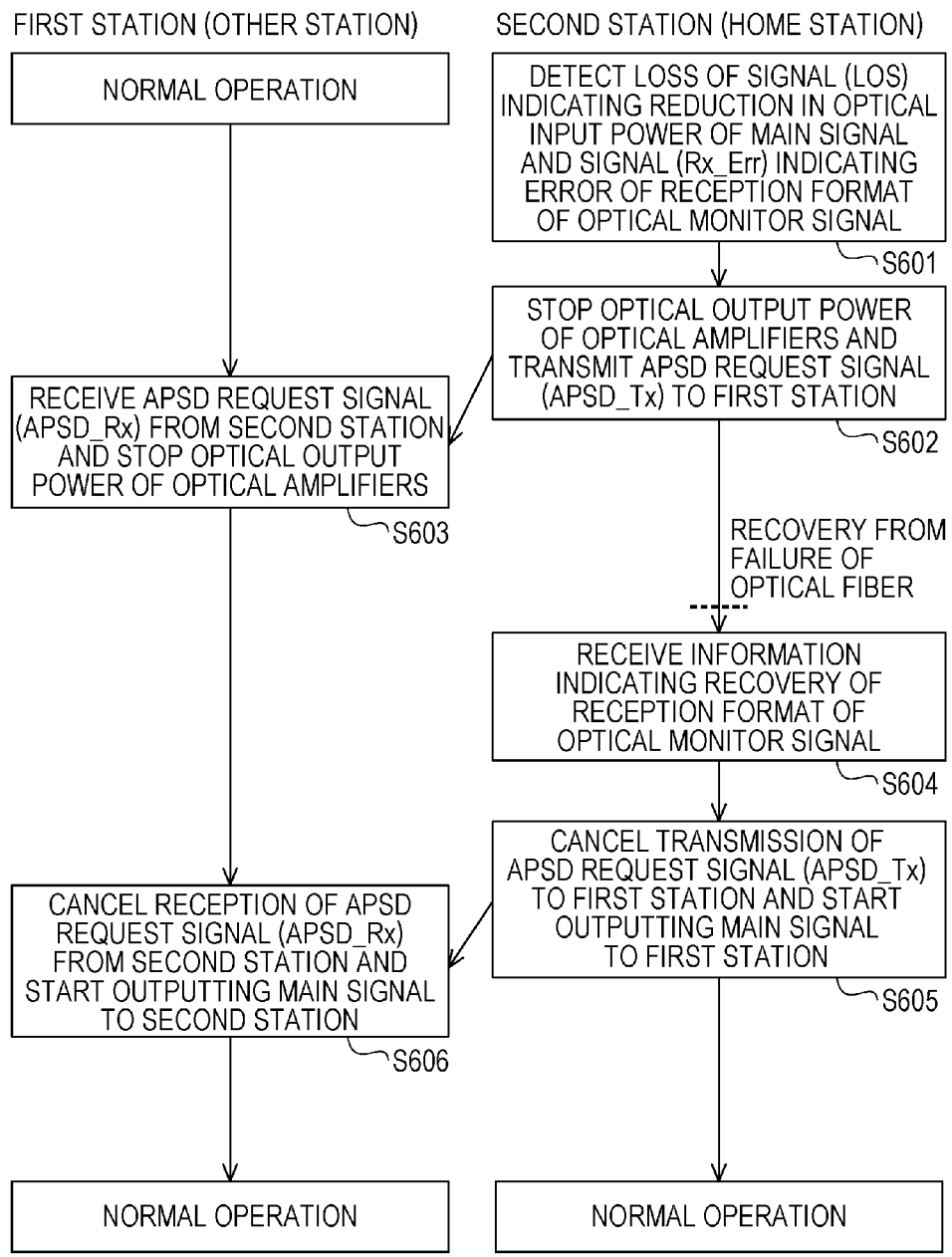
FIG. 6 is a sequence diagram illustrating operations of a home station and operations of another station if the failure illustrated in FIG. 5 occurs.

FIG. 6 is a sequence diagram illustrating operations of the home station and operations of the other station if the failure illustrated in FIG. 5 occurs. In the following description, a symbol "_Tx" indicates a signal that is transmitted by a transmitter, and a symbol "_Rx" indicates a signal that is received by a receiver. If symbols located in front of the symbols "_Tx" and "_Rx" are the same, the signals are the same (for example, the signals APSD_Tx and APSD_Rx are the same).

If the failure occurs at the location 501 of the optical fiber 101, the first APSD controller 152 of the controller 132 of the second station detects the loss of signal (LOS) indicating a reduction in the optical input power of the main signal and the reception format error signal (Rx_Err) indicating the error of the monitor signal (in operation S601). Then, the first APSD controller 152 of the second station stops the optical output power of the optical amplifiers 111 and 121 and transmits the APSD request signal (APSD_Tx) to the first station (in operation S602).

The first APSD controller 152 of the first station receives the APSD request signal (APSD_Rx) from the second station and stops the optical output power of the optical amplifiers 111 and 121 (in operation S603). Since the first station stops optical output to the optical fiber 101 in which the failure has occurred, the optical power may be inhibited from leaking from the location 501.

After that, when the optical fiber 101 is recovered from the failure at the location 501, the second station receives information indicating a recovery of the reception format of the optical monitor signal (in operation S604). Thus, the first APSD controller 152 of the second station cancels transmission of the APSD request signal (APSD_Tx) to the first station (stops the transmission), starts outputting the optical main signal to the first station (in operation S605), and returns to the normal operation.

The first APSD controller 152 of the first station cancels the reception of the APSD request signal (APSD_Rx) transmitted by the second station, starts outputting the main signal to the second station (in operation S606), and returns to the normal operation.

Figure 7:
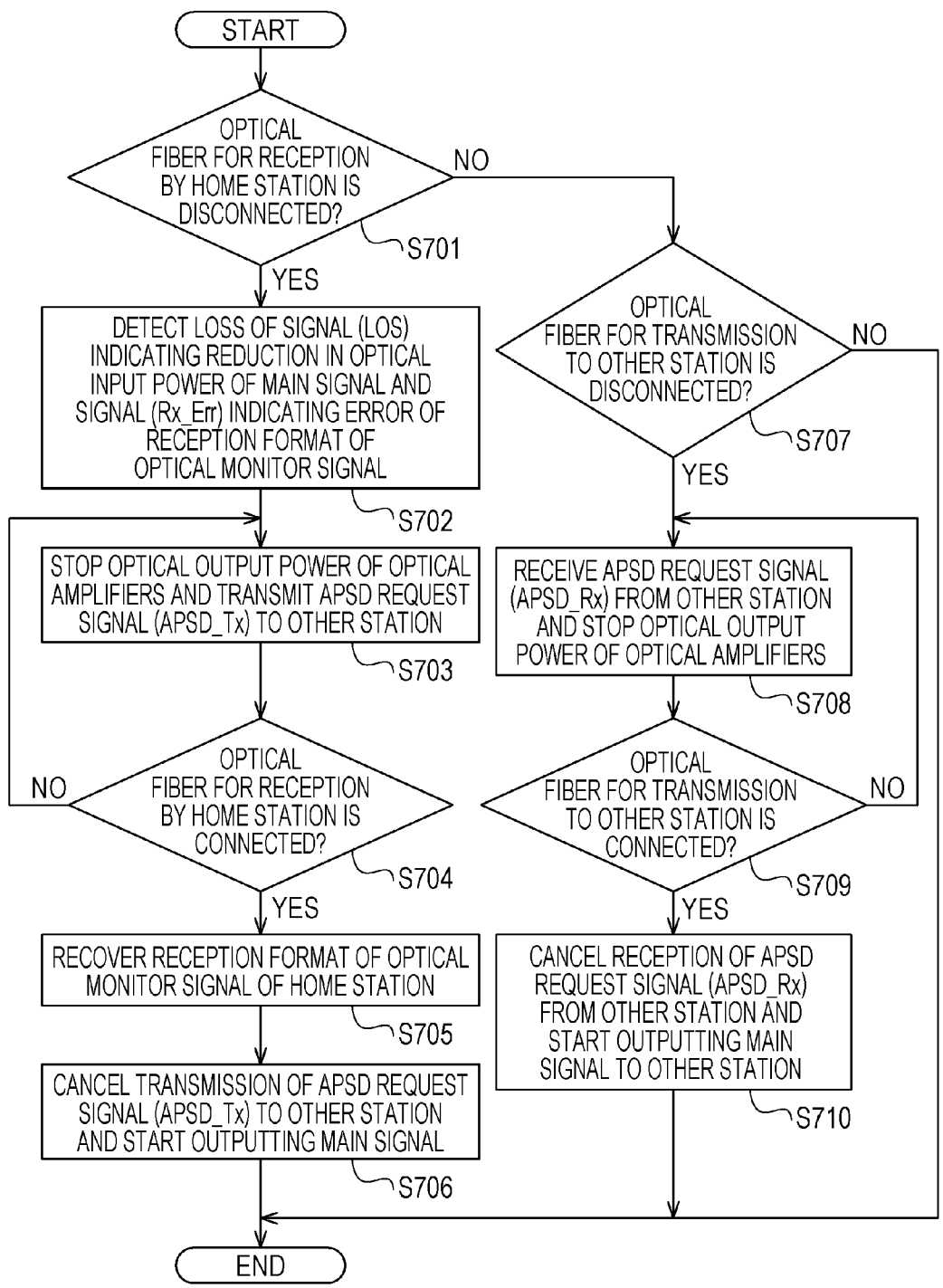
FIG. 7 is a flowchart of a process that is executed before and after a failure occurs during a normal operation of the home station.

FIG. 7 is a flowchart of a process that is executed before and after a failure occurs during the normal operation of the home station. FIG. 7 illustrates the process that is executed by the first APSD controller 152 of the controller 132 of the home station (second station illustrated in FIG. 5).

The first APSD controller 152 determines whether or not the failure is a disconnection of the (downstream) optical fiber 101 for reception by the home station (in operation S701). If the failure is the disconnection of the optical fiber 101 for reception by the home station (Yes in operation S701), the process proceeds to operation S702. If the failure is not the disconnection of the optical fiber 101 for reception by the home station (or is a disconnection of the optical fiber 101 for transmission to the other station) (No in operation S701), the process proceeds to operation S707.

The first APSD controller 152 detects the loss of signal (LOS) indicating a reduction in the optical input power of the main signal and the reception format error signal (Rx_Err) indicating the error of the monitor signal (in operation S702). Thus, the first APSD controller 152 stops the optical output power of the optical amplifiers 111 and 121 and transmits the APSD request signal (APSD_Tx) to the other station (first station illustrated in FIG. 5) (in operation S703).

After that, for recovery from the failure of the optical fiber 101, the first APSD controller 152 determines whether or not the (downstream) optical fiber 101 for reception by the home station is connected (in operation S704). If the optical fiber 101 for reception by the home station is not connected (No in operation S704), the process returns to operation S703. If the optical fiber 101 for reception by the home station is connected (Yes in operation S704), the first APSD controller 152 receives information indicating a recovery of the reception format of the optical monitor signal in the home station (in operation S705). Then, the first APSD controller 152 cancels transmission of the APSD request signal (APSD_Tx) to the other station and starts outputting the main signal to the other station (in operation S706). Then, the process that is executed for the failure is terminated.

The first APSD controller 152 determines whether or not the (upstream) optical fiber 101 for transmission to the other station is disconnected (or a failure occurs) (in operation S707). If the optical fiber 101 for transmission to the other station is disconnected (Yes in operation S707), the process proceeds to operation S708. If the optical fiber 101 for transmission to the other station is not disconnected (No in operation S707), the process is terminated.

The first APSD controller 152 receives the APSD request signal (APSD_Rx) from the other station and stops the optical output power of the optical amplifiers 111 and 121 (in operation S708).

After that, for recovery from the failure of the optical fiber 101, the first APSD controller 152 determines whether or not the (upstream) optical fiber 101 for transmission to the other station is connected (in operation S709). If the optical fiber 101 for transmission to the other station is not connected (No in operation S709), the process returns to operation S708. If the optical fiber 101 for transmission to the other station is connected (Yes in operation S709), the first APSD controller 152 cancels reception of the APSD request signal (APSD_Rx) from the other station and starts outputting the main signal to the other station (in operation S710). Then, the process that is executed for the failure is terminated.

As described above, during the normal operation of the first APSD controller 152, the controller 132 of the home station inhibits the optical signal from leaking upon a failure of the (downstream) optical fiber 101 through which the home station receives the optical signal and upon a failure of the (upstream) optical fiber 101 through which the home station transmits the optical signal.

Update of Program of Home Station

Figure 8:
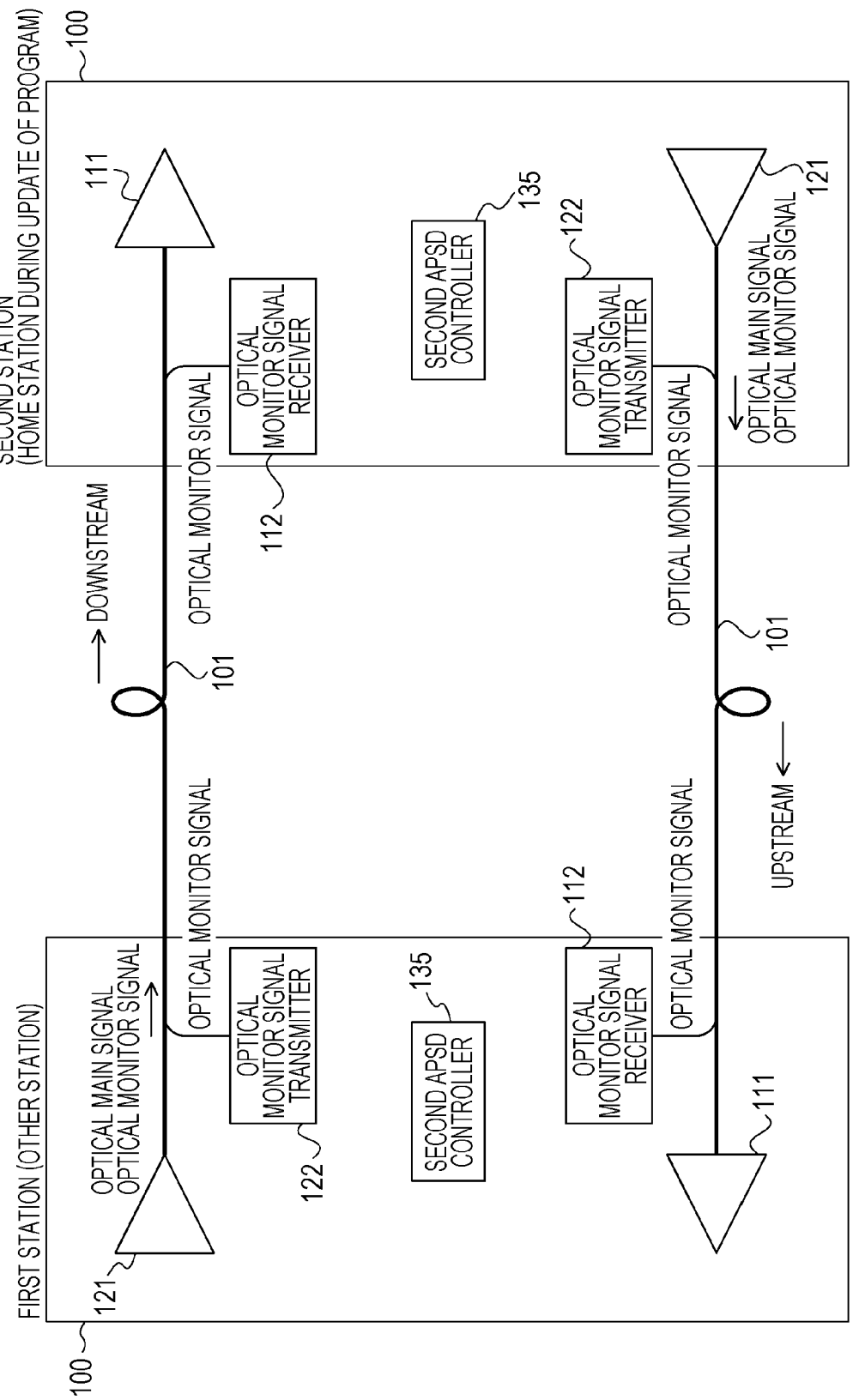
FIG. 8 is a diagram illustrating a state in which a program of a controller of the home station is updated.

FIG. 8 is a diagram illustrating a state in which the program of the controller of the home station is updated. As illustrated in FIG. 8, the second APSD controller 135 operates during the update of the program of the home station (second station). Since the connection of the optical fiber 101 between the home station (second station) and the other station (first station) is normal, APSD control is not executed.

Figure 9:
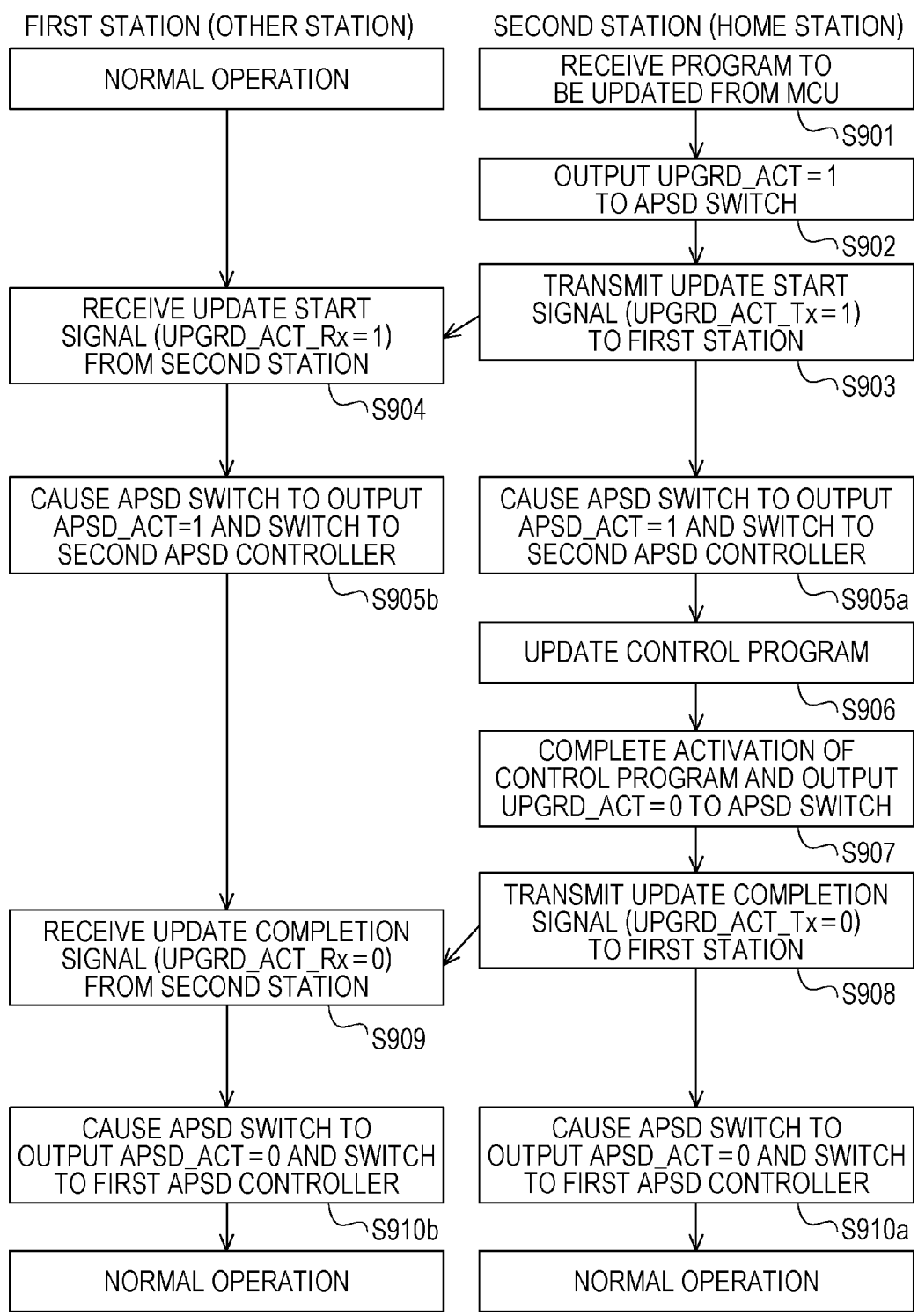
FIG. 9 is a sequence diagram illustrating operations of the controller of the home station and operations of a controller of the other station upon the update, described with reference to FIG. 8, of the program of the home station.

FIG. 9 is a sequence diagram illustrating operations of the controller 132 of the home station and operations of the controller 132 of the other station upon the update (described with reference to FIG. 8) of the program of the controller 132 of the home station. A process that is executed for a time period from the start of the update of the control program of the controller 132 of the home station (second station) to the time when the first and second stations normally operate is described below.

First, the controller 132 of the second station receives the control program to be updated from the MCU 133 (in operation S901). When receiving a request to start the update from the MCU 133, the controller 132 of the second station outputs the update start signal (UPGRD_ACT=1) to the APSD switch 155 of the first station (in operation S902). Then, the controller 132 of the second station transmits a signal (UPGRD_ACT_Tx=1) indicating the start of the update to the first station (in operation S903). Then, the controller 132 of the first station receives the update start signal (UPGRD_ACT_Rx=1) from the second station (in operation S904).

Since the controllers 132 of the first and second stations receive the update start signal, the APSD switches 155 output the switch signal (APSD_ACT=1) so as to switch the operations from the first APSD controllers 152 to the second APSD controllers 135 (in operations 905a and 905b).

After that, the MCU 133 of the second station updates the control program (in operation S906). When the activation of the control program updated in the second station is completed, the MCU 133 outputs an update completion signal (UPGRD_ACT=0) to the APSD switch 155 (in operation S907). Then, the controller 132 of the second station transmits the signal (UPGRD_ACT_Tx=0) indicating the completion of the update to the first station (in operation S908).

Then, the first station receives the update completion signal (UPGRD_ACT_Rx=0) from the second station (in operation S909). Since the first and second stations each receives the update completion signal, the APSD switches 155 output the switch signal (APSD_ACT=0) and switch the operations from the second APSD controllers 135 to the first APSD controllers 152 (in operations S910a and S910b). After that, the second station normally operates with the updated control program.

Operations to be Executed if Failure Occurs in Optical Fiber During Update of Program of Home Station Next, operations that are executed if a failure occurs in the optical fiber during the update of the control program of the transmission device 100 of the home station (second station) are described. During the update of the control program, the controller 132 (the first APSD controller 152) of the home station does not operate during the update of the control program. In this state, if a failure such as a disconnection of the optical fiber 101 occurs, the home station detects the failure and executes the APSD control. After the execution of the APSD control, the failure is recovered. After the recovery from the failure, the signal communication of an optical transmission system is automatically restored.

Figure 10:
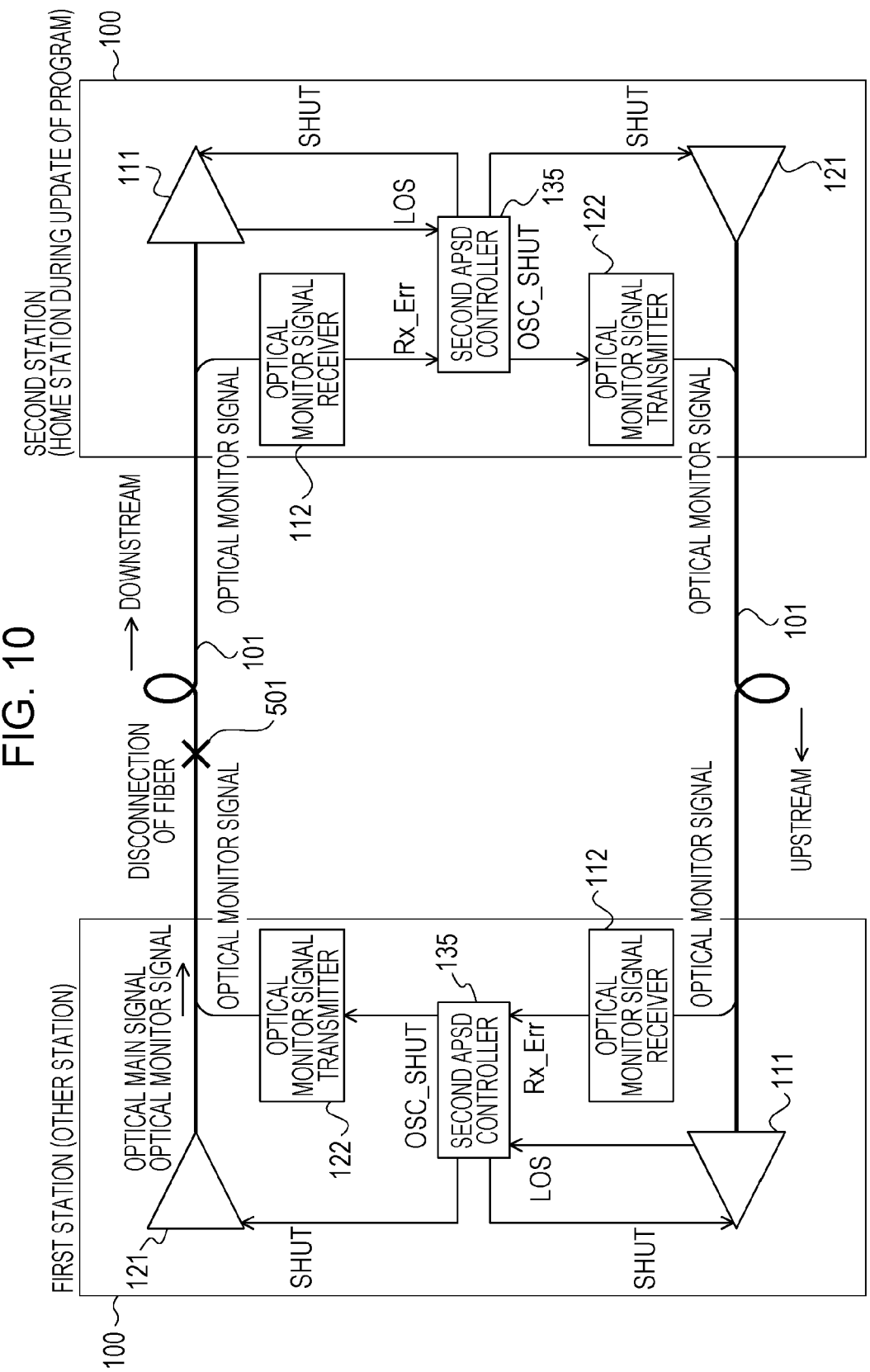
FIG. 10 is a diagram illustrating a state in which a failure occurs in the downstream optical fiber when the controller of the transmission device of the home station updates the program.

FIG. 10 is a state in which a failure occurs in the downstream optical fiber when the controller of the transmission device of the home station updates the program. As illustrated in FIG. 10, the second APSD controllers 135 of the first and second stations operate. When detecting the loss of signal (LOS) indicating a reduction in the optical input power of the main signal and the reception format error signal (Rx_Err) indicating the error of the monitor signal, the second APSD controllers 135 execute control so as to stop LD output (or output of the SHUT signal) and execute control so as to stop the output of the optical monitor signal (output of the OSC_SHUT signal).

Figure 11:
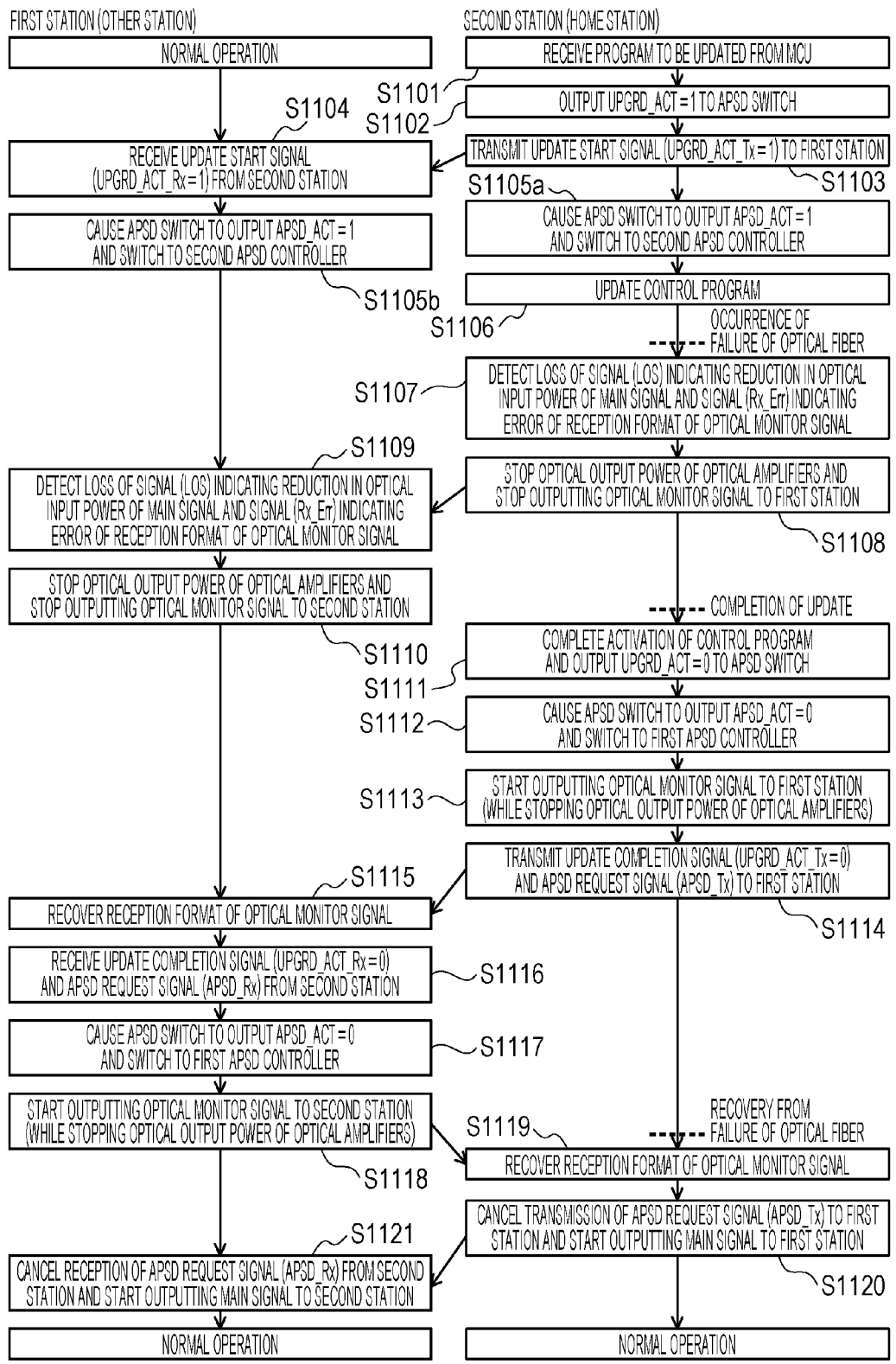
FIG. 11 is a sequence diagram illustrating a first example of operations of the home station and operations of the other station if a failure occurs during the update, described with reference to FIG. 9, of the program.

First Example of Operations to be Executed if Failure Occurs in Optical Fiber During Update of Program of Home Station FIG. 11 is a sequence diagram illustrating a first example of operations of the home station and operations of the other station if a failure occurs in the optical fiber 101 during the update (described with reference to FIG. 9) of the program. A procedure of operations S1101 to S1106 from the reception of the updated program by the controller 132 from the MCU 133 to the start of the update of the program is the same as the procedure of operations S901 to S906 illustrated in FIG. 9.

If the failure occurs in the downstream optical fiber 101 during the update of the control program, the second APSD controller 135 of the second station detects the loss of signal (LOS) indicating a reduction in the optical input power of the main signal and the reception format error signal (Rx_Err) indicating the error of the monitor signal and determines the occurrence of the failure of the optical fiber 101 (in operation S1107). Then, the second APSD controller 135 of the second station outputs the SHUT signal to stop the optical output power of the optical amplifiers 111 and 121 and outputs the OSC_SHUT signal to stop the output of the optical monitor signal to the first station (in operation S1108).

The second APSD controller 135 of the first station detects the loss of signal (LOS) indicating a reduction in the optical input power of the main signal and the reception format error signal (Rx_Err) indicating the error of the monitor signal (in operation S1109). Then, the second APSD controller 135 of the first station outputs the SHUT signal to stop the optical output power of the optical amplifier 121 in order to inhibit the optical power from leaking from the failure location 501 and outputs the OSC_SHUT signal to stop the output of the optical monitor signal to the second station (in operation S1110).

In the second station, when the activation of the updated control program is completed, the MCU 133 outputs the update completion signal (UPGRD_ACT=0) indicating the completion of the update of the control program of the second station to the APSD switch 155 (in operation S1111). The APSD switch 155 receives the update completion signal, thereby outputs the switch signal (APSD_ACT=0) so as to switch the second APSD controller 135 to the first APSD controller 152 and restores the control (in operation S1112).

When receiving the switch signal (APSD_ACT=0) from the APSD switch 155, the second APSD controller 135 of the second station outputs the output stop cancellation signal (OSC_SHUT=0) indicating the cancellation of the stop of the output of the optical monitor signal to the first station and causes the optical monitor signal to be output. In this case, the failure location 501 of the optical fiber 101 is yet to be restored, the loss of signal (LOS) indicating the reduction in the optical input power of the main signal and the reception format error signal (Rx_Err) indicating the error of the monitor signal are detected, and the optical output power of the optical amplifiers 111 and 121 of the second station remains stopped (in operation S1113).

After that, the control information transceiver 151 of the controller 132 operates and transmits, to the first station, the monitor signal with the signal (UPGRD_ACT_Tx=0) indicating the completion of the update of the program of the second station. Since the loss of signal (LOS) indicating the reduction in the optical input power of the main signal and the reception format error signal (Rx_Err) indicating the error of the monitor signal are detected by the second station, the control information transceiver 151 of the controller 132 transmits the APSD request signal (APSD_Tx) to the first station (in operation S1114).

Thus, the upstream optical monitor signal is communicated, and the reception of the reception format error signal (Rx_Err) indicating the monitor signal is cancelled by the first station (recovery of the reception format in operation S1115). Then, the first station receives the update completion signal (UPGRD_ACT_Rx=0) and the APSD request signal (APSD_Rx) from the second station (in operation S1116). Since the first station receives the update completion signal, the APSD switch 155 outputs the switch signal (APSD_ACT=0) so as to switch the second APSD controller 135 to the first APSD controller 152 and restore the operation (in operation S1117). When receiving the switch signal (APSD_ACT=0) from the APSD switch 155, the second APSD controller 135 of the first station outputs the output stop cancellation signal (OSC_SHUT=0) indicating the cancellation of the stop of the output of the optical monitor signal to the second station and causes the first station to start outputting the optical monitor signal (in operation S1118). In this state, the optical output power of the optical amplifier 121 remains stopped.

When the downstream optical fiber 101 is recovered from the failure at the location 501, the downstream optical monitor signal is communicated and the reception of the reception format error signal (Rx_Err) indicating the error of the monitor signal is cancelled by the second station (recovery of the reception format in operation S1119).

After that, the second station cancels transmission of the APSD request (APSD_Tx) to the first station and starts outputting the main signal to the first station (in operation S1120). The first station cancels the reception of the APSD request signal (APSD_Rx) from the second station and starts outputting the main signal to the second station (in operation S1121).

As described above, the APSD switch 155 switches between the first APSD controller 152 and the second APSD controller 135 on the basis of the state of the operation of the controller 132. If a failure of the optical fiber 101 occurs during the time when the first APSD controller 152 is out of order due to the update of the control program or the like, the second APSD controller 135 stops the optical output power of the optical amplifiers 111 and 121. Thus, the optical signal may be inhibited from leaking from the failure location 501 of the optical fiber 101. In addition, after the control program is activated after the restoration from the failure and the update of the control program, the signal communication is automatically restored after the recovery from the failure by switching the second APSD controller 135 to the first APSD controller 152. Thus, the signal communication may be automatically restored in a safe manner without a cumbersome task by an operator.

The process example described with reference to FIG. 11 is the process of restoring the optical fiber 101 from the failure at the location 501 of the optical fiber 101 during the update of the control program of the controller 132 after the execution of the APSD control, the completion of the update of the control program, and the activation of the control program. In this example, a time period from the occurrence of the failure of the optical fiber 101 to the recovery from the failure is longer than a time period from the start of the update of the control program to the activation of the control program. However, if a connector of the optical fiber 101 is released due to a mistake by an operator of the transmission device 100 or the like, and the connection of the optical fiber 101 is restored immediately after the release, a time period from the release of the connector at the failure location 501 to the restoration of the connection is approximately several seconds. Thus, the optical fiber 101 may be restored from the failure within a short time during the update of the control program.

Second Example of Operations to be Executed if Failure Occurs in Optical Fiber During Update of Program of Home Station FIG. 12 is a sequence diagram illustrating an example of operations of the home station and operations of the other station if a failure occurs during the update (described with reference to FIG. 9) of the control program. A process illustrated in FIG. 12 is different from the process illustrated in FIG. 11 in that the downstream optical fiber 101 is restored from the failure within a short time in the process illustrated in FIG. 12. Operations S1201 to S1210 illustrated in FIG. 12 are the same as the operations S1101 to S1110 illustrated in FIG. 11. Specifically, in operations S1201 to S1210, the control program to be updated is received from the MCU 133 and starts to be updated, the failure of the optical fiber 101 occurs after the start of the update, and the APSD control is executed.

As illustrated in FIG. 12, it is assumed that the optical fiber 101 is restored from the failure before the completion of the update of the control program and the activation of the control program.

In this case, the controller 132 is not activated and the second APSD controller 135 operates. In addition, the first station stops outputting the main signal and the optical monitor signal, and whereby the second station stops the optical output power of the optical amplifiers 111 and 121 of the second station and stops outputting the optical monitor signal, as indicated by operation S1208.

After that, when the activation of the updated control program is completed in the second station, the MCU 133 outputs the update completion signal (UPGRD_ACT=0) to the APSD switch 155 in the second station (in operation S1211). The APSD switch 155 receives the update completion signal, thereby outputs the switch signal (APSD_ACT=0), and switches the second APSD controller 135 to the first APSD controller 152 so as to restore the operation (in operation S1212).

After that, the second APSD controller 135 of the second station receives the switch signal (APSD_ACT=0) from the APSD switch 155, outputs, to the first station, the output stop cancellation signal (OSC_SHUT=0) indicating the cancellation of the stop of the output of the optical monitor signal, and causes the optical monitor signal to be output. In this case, the optical output power of the optical amplifiers 111 and 121 of the first station and the output of the optical monitor signal remain stopped. Thus, the second station detects the loss of signal (LOS) indicating a reduction in the optical input power of the main signal and the reception format error signal (Rx_Err) indicating the error of the monitor signal, and the optical output power of the optical amplifiers 111 and 121 of the second station remains stopped (in operation S1213).

Subsequent operations S1214 to S1221 are the same as operations S1114 to S1121 illustrated in FIG. 11. Operations S1214 to S1221 are the process from the recovery of the communication of the upstream and downstream optical monitor signals by the operation of the control information transceiver 151 to the restoration to the normal operations.

The aforementioned example describes the operations to be executed for the failure that occurs during the update of the control program of the transmission device 100 of the second station. As described above, even if a failure occurs in the optical fiber 101 during the update of the control program of the home station and the optical fiber 101 is restored, the second APSD controllers 135 are switched to the original first APSD controllers 152 after the restoration from the failure and the completion of the activation of the updated control program. Thus, the signal communication may be automatically restored after the recovery from the failure.

Figure 13:
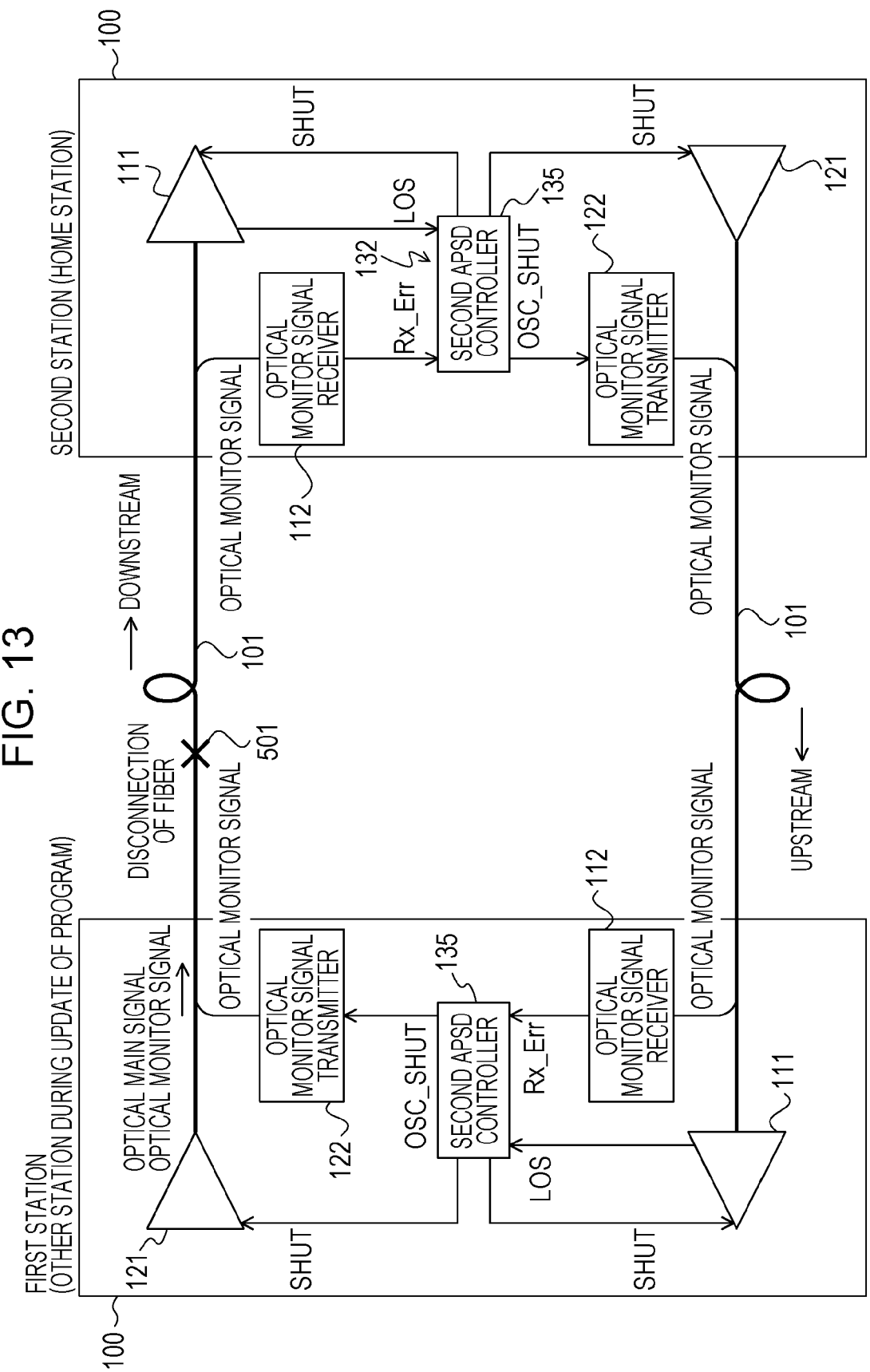
FIG. 13 is a diagram illustrating a state in which a failure occurs in the downstream optical fiber when the controller of the transmission device of the other station updates the program.

Operations to be Executed if Failure Occurs in Optical Fiber During Update of Program of Other Station Next, operations that are executed if a failure occurs in the optical fiber 101 during the update of the control program of the transmission device 100 of the other station (first station) are described. FIG. 13 is a sequence diagram illustrating a state in which the failure of the downstream optical fiber 101 occurs when the controller 132 of the transmission device 100 of the other station updates the control program. As illustrated in FIG. 13, in the first and second stations, the second APSD controllers 135 operate.

Figure 14:
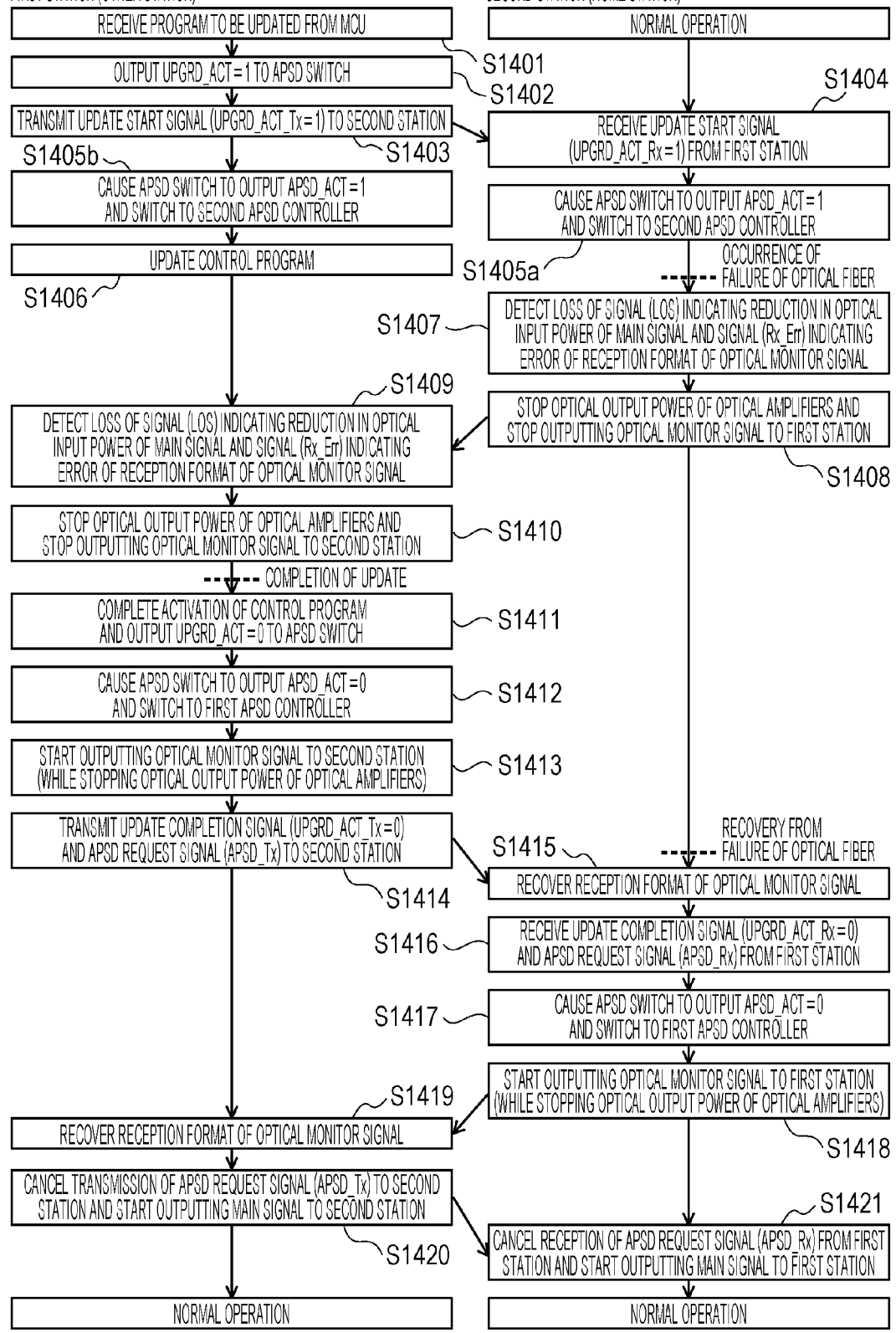
FIG. 14 is a sequence diagram describing a process of detecting a failure of the downstream optical fiber and restoring signal communication in the state illustrated in FIG. 13.

FIG. 14 is a sequence diagram illustrating a process of detecting a failure of the downstream optical fiber 101 and restoring signal communication in the state illustrated in FIG. 13. First, the controller 132 of the first station receives the control program to be updated from the MCU 133 (in operation S1401). When receiving a request to start the update from the MCU 133, the controller 132 of the first station outputs the update start signal (UPGRD_ACT=1) to the APSD switch 155 (in operation S1402). Then, the controller 132 of the first station transmits, to the second station, the signal (UPGRD_ACT_Tx=1) indicating the start of the update of the control program of the first station (in operation S1403).

Next, the second station receives the update start signal (UPGRD_ACT_Rx=1) from the first station (in operation S1404). After that, in the first and second stations, the controllers 132 receive the update start signal, and whereby the APSD switches 155 output the switch signal (APSD_ACT=1) so as to switch the first APSD controllers 152 to the second APSD controllers 135 (in operation S1405a and S1405b).

After that, if the failure of the optical fiber 101 occurs, the second station may cause the second APSD controller 135 to stop the optical output power of the optical amplifiers 111 and 121 and stop outputting the optical monitor signal. In addition, the first station may detect the loss of signal (LOS) indicating a reduction in the optical input power of the main signal and the reception format error signal (Rx_Err) indicating the error of the monitor signal due to the operation of the second APSD controller 135 of the second station. Then, the second APSD controller 135 of the first station may stop the optical output power of the optical amplifier 121.

Then, the first station updates the control program (in operation S1406). It is assumed that the failure occurs at the location 501 in the downstream optical fiber 101 during the update of the control program of the first station. Based on this assumption, the second APSD controller 135 of the second station detects the loss of signal (LOS) indicating a reduction in the optical input power of the main signal and the reception format error signal (Rx_Err) indicating the error of the monitor signal and determines the occurrence of the failure of the optical fiber 101 (in operation S1407). Then, the second APSD controller 135 of the second station outputs the SHUT signal to stop the optical output power of the optical amplifiers 111 and 121 and outputs the OSC_SHUT signal to stop the output of the optical monitor signal to the first station (in operation S1408).

Then, the second APSD controller 135 of the first station detects the loss of signal (LOS) indicating a reduction in the optical input power of the main signal and the reception format error signal (Rx_Err) indicating the error of the monitor signal (in operation S1409). After that, the second APSD controller 135 of the first station outputs the SHUT signal to stop the optical output power of the optical amplifier 121 so as not to cause the optical power to leak from the location 501 and outputs the OSC_SHUT signal to stop the output of the optical monitor signal to the second station (in operation S1410).

After that, when the activation of the updated control program of the first station is completed, the MCU 133 of the first station outputs the update completion signal (UPGRD_ACT=0) to the APSD switch 155 (in operation S1411). In the first station, the APSD switch 155 that receives the update completion signal outputs the switch signal (APSD_ACT=0) and switches the second APSD controller 135 to the first APSD controller 152 so as to restore the operation (in operation S1412).

When receiving the switch signal (APSD_ACT=0) from the APSD switch 155, the second APSD controller 135 of the first station outputs, to the second station, the output stop cancellation signal (OSC_SHUT=0) indicating the cancellation of the stop of the output of the optical monitor signal and causes the optical monitor signal to be output. In this case, since the second station stops the optical output power of the optical amplifiers 111 and 121 and stops outputting the optical monitor signal, the first station detects the loss of signal (LOS) indicating a reduction in the optical input power of the main signal and the reception format error signal (Rx_Err) indicating the error of the monitor signal while stopping outputting the optical output power of the optical amplifier 121 (in operation S1413). In addition, the control information transceiver 151 of the controller 132 of the first station operates and transmits, to the second station, the monitor signal with the signal (UPGRD_ACT_Tx=0) indicating the completion of the update of the first station. Since the first station detects the loss of signal (LOS) indicating the reduction in the optical input power of the main signal and the reception format error signal (Rx_Err) indicating the error of the monitor signal, the first station transmits the APSD request signal (APSD_Tx) to the second station (in operation S1414).

After that, when the downstream optical fiber 101 is recovered from the failure, the optical monitor signal is communicated from the first station to the second station, and the reception of the reception format error signal (Rx_Err) indicating the error of the monitor signal by the second station is cancelled (recovery of the reception format in operation S1415). Then, the second station receives the update completion signal (UPGRD_ACT_Rx=0) and the APSD request signal (APSD_Rx) from the first station (in operation S1416). Since the second station receives the update completion signal, the APSD switch 155 of the second station outputs the switch signal (APSD_ACT=0) and switches the second APSD controller 135 to the first APSD controller 152 so as to restore the operation (in operation S1417). When receiving the switch signal (APSD_ACT=0) from the APSD switch 155, the second APSD controller 135 of the second station outputs, to the first station, the output stop cancellation signal (OSC_SHUT=0) indicating the cancellation of the stop of the output of the optical monitor signal, and the second station outputs the optical monitor signal (in operation S1418).

Thus, the optical monitor signal is transmitted from the second station to the first station. The first station cancels the reception of the reception format error signal (Rx_Err) indicating the error of the monitor signal (recovery of the reception format in operation S1419). In the first station, when the reception format of the monitor signal is recovered from the reception format error, the transmission of the APSD request signal (APSD_Tx) from the first station to the second station is cancelled, the output of the SHUT signal from the first APSD controller 152 is cancelled, and the optical amplifier 121 of the first station operates so as to recover the downstream main signal (in operation S1420).

When the transmission of the APSD request signal (APSD_Rx) from the first station to the second station is cancelled, the output of the SHUT signal from the first APSD controller 152 is cancelled and the optical amplifier 121 of the second station operates so as to recover the upstream main signal (in operation S1421). When the main signal is input to the first and second stations through the optical fiber 101, the optical amplifiers 111 and 121 operate and the first and second stations are restored to the states before the occurrence of the failure of the optical fiber 101.

As described above, when the controller 132 of the first station does not operate due to the update of the control program of the transmission device 100 of the first station, the first and second stations may handle the occurrence of a failure of the downstream optical fiber 101. In this case, the second APSD controller 135 that is switched by the APSD switch 155 detects the failure of the optical fiber 101, stops the optical output power of the optical amplifier 121, and is switched to the original first APSD controller 152 after the completion of the activation of the control program. Thus, the signal communication is automatically restored after the recovery from the failure.

The case where the control program of the controller 132 of the transmission device 100 of the first or second station is updated during the time when the transmission device 100 operates is described above. The first embodiment, however, is not limited to this. The first embodiment is applicable to the case where the control programs of the controllers 132 of the transmission devices 100 of the first and second stations are updated. The second APSD controllers 135 of the first and second stations operate, detect a failure of the optical fiber 101, stop the optical output power of the optical amplifiers 111 and 121 and the output of the optical monitor signal, and are switched to the first APSD controllers 152 after the restoration from the failure and the completion of the activation of the control program. Thus, the signal communication may be automatically restored after the recovery from the failure.

Figure 15:
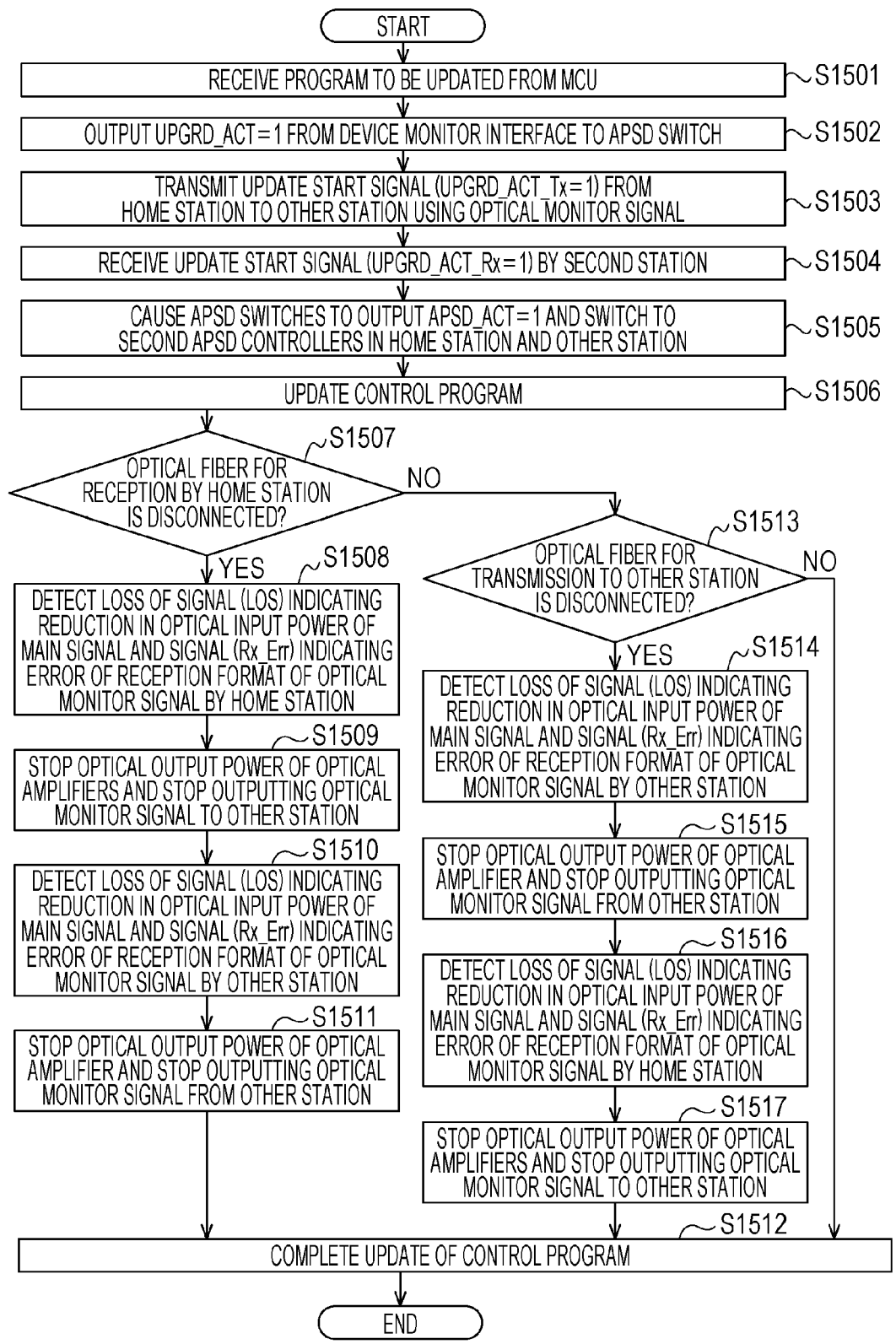
FIG. 15 is a flowchart of a process that is executed if a failure occurs during the update of the control program according to the first embodiment.

FIG. 15 is a flowchart of a process that is executed if a failure occurs during the update of the control program according to the first embodiment. FIG. 15 illustrates the contents of the process that is executed for a time period from the occurrence of the failure in the transmission device 100 illustrated in FIG. 1 to the stop of the optical power.

First, the controller 132 of the transmission device 100 receives the control program to be updated from the MCU 133 (in operation S1501). Next, the device monitor I/F 154 of the controller 132 outputs the update start signal (UPGRD_ACT=1) to the APSD switch 155 (in operation S1502). Then, the controller 132 of the home station transmits the optical monitor signal with the update start signal (UPGRD_ACT_Tx=1) to the other station (in operation S1503).

After that, the other station receives the update start signal (UPGRD_ACT_Rx=1) (in operation S1504). In the first and second stations, the APSD switches 155 output the switch signal (APSD_ACT=1) so as to switch the operations from the first APSD controllers 152 to the second APSD controllers 135 (in operation S1505). Then, the MCUs 133 update the control programs (in operations S1506).

After that, the second APSD controller 135 determines whether or not the optical fiber 101 for reception by the home station is disconnected (in operation S1507). If the optical fiber 101 for reception by the home station is disconnected (Yes in operation S1507), the process proceeds to operation S1508. If the optical fiber 101 for reception by the home station is not disconnected (or the optical fiber 101 for transmission to the other station is disconnected (No in operation S1507)), the process proceeds to operation S1513.

The second APSD controller 135 of the home station detects the loss of signal (LOS) indicating a reduction in the optical input power of the main signal and the reception format error signal (Rx_Err) indicating the error of the monitor signal (in operation S1508). Thus, the second APSD controller 135 stops the optical output power of the optical amplifiers 111 and 121 and the output of the optical monitor signal (in operation S1509).

Thus, the other station detects the loss of signal (LOS) indicating a reduction in the optical input power of the main signal and the reception format error signal (Rx_Err) indicating the error of the monitor signal (in operation S1510). Then, the other station stops the optical output power of the optical amplifier 121 and stops outputting the optical monitor signal to the home station (in operation S1511). After that, the control program is completely updated (in operation S1512).

The second APSD controller 135 determines whether or not the optical fiber 101 for transmission to the other station is disconnected (in operation S1513). If the optical fiber 101 for transmission to the other station is disconnected (Yes in operation S1513), the process proceeds to operation S1514. If the optical fiber 101 for transmission to the other station is not disconnected (No in operation S1513), the process proceeds to operation S1512.

The other station detects the loss of signal (LOS) indicating a reduction in the optical input power of the main signal and the reception format error signal (Rx_Err) indicating the error of the monitor signal (in operation S1514). Thus, the other station stops the optical output power of the optical amplifier 121 and stops outputting the optical monitor signal to the home station (in operation S1515).

After that, the home station detects the loss of signal (LOS) indicating a reduction in the optical input power of the main signal and the reception format error signal (Rx_Err) indicating the error of the monitor signal (in operation S1516). Thus, the home station stops the optical output power of the optical amplifiers 111 and 121 and stops outputting the optical monitor signal to the other station (in operation S1517). After that, the control program is completely updated (in operation S1512).

Figure 16:
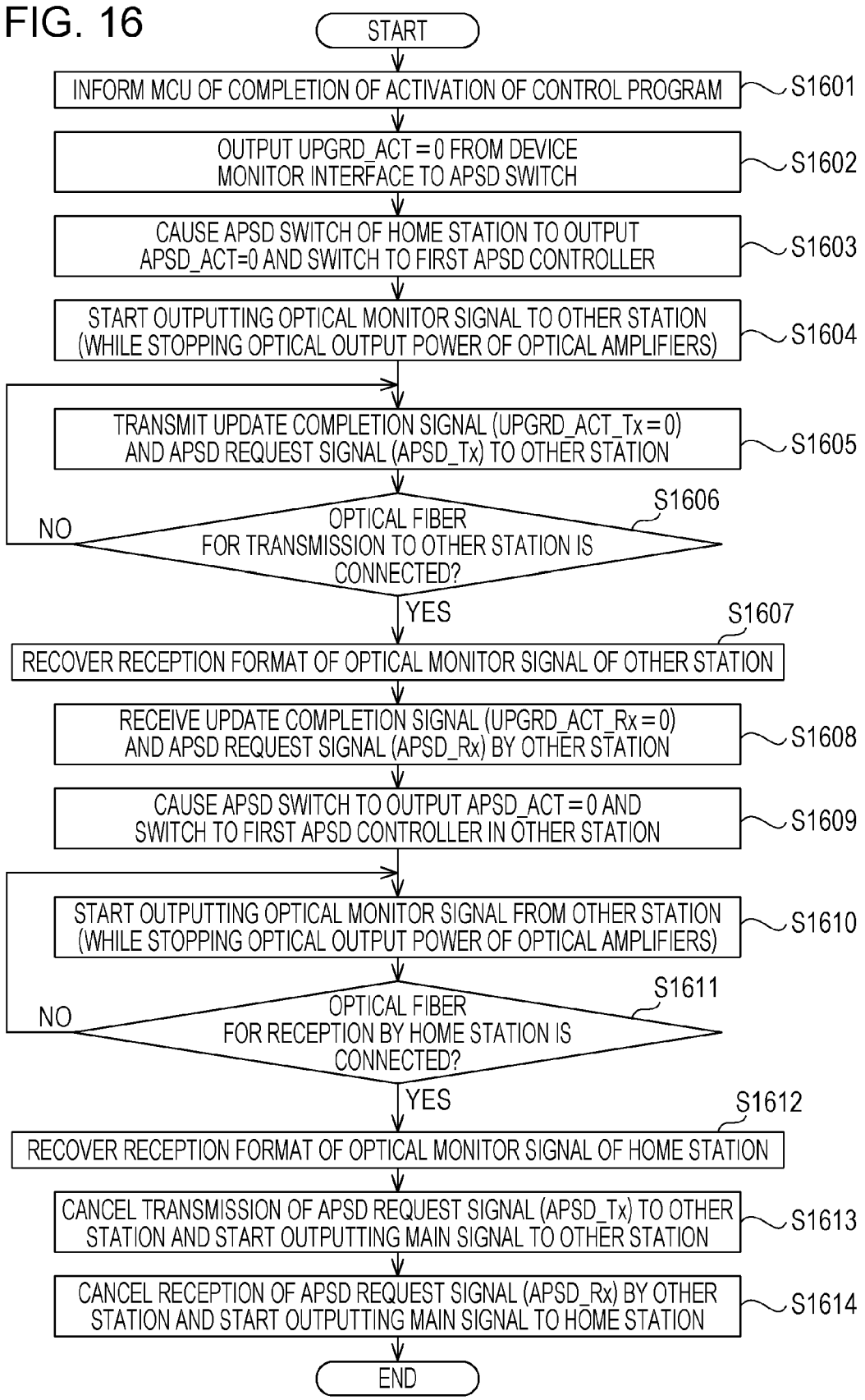
FIG. 16 is a flowchart of a process that is executed after restoration from a failure according to the first embodiment.

FIG. 16 is a flowchart of a process that is executed after the restoration from the failure according to the first embodiment. FIG. 16 illustrates the process that is executed after the process illustrated in FIG. 15. First, the controller 132 of the home station informs the MCU 133 of the completion of the activation of the control program (in operation S1601). Next, the device monitor I/F 154 outputs the update completion signal (UPGRD_ACT=0) to the APSD switch 155 (in operation S1602).

Then, the APSD switch 155 of the home station outputs the switch signal (APSD_ACT=0) and switches the second APSD controller 135 to the first APSD controller 152 so as to restore the operation (in operation S1603). Thus, the home station starts outputting the optical monitor signal to the second station. In this case, the optical output power of the optical amplifier 121 remains stopped (in operation S1604). After that, the home station transmits the update completion signal (UPGRD_ACT_Tx=0) and the APSD request signal (APSD_Tx) to the other station (in operation S1605).

After that, the home station determines whether or not the optical fiber 101 for transmission to the other station is connected (in operation S1606). If the optical fiber 101 for transmission to the other station is not connected (No in operation S1606), the process returns to operation S1605. If the optical fiber 101 for transmission to the other station is connected (Yes in operation S1606), the process proceeds to operation S1607.

The reception format of the monitor signal of the other station is recovered (in operation S1607). Thus, the other station receives the update completion signal (UPGRD_ACT_Rx=0) and the APSD request signal (APSD_Rx) (in operation S1608). In the other station, the APSD switch 155 outputs the switch signal (APSD_ACT=0) and switches the second APSD controller 135 to the first APSD controller 152 so as to restore the operation (in operation S1609). Thus, the other station starts outputting the optical monitor signal, and the optical output power of the optical amplifier 121 remains stopped (in operation S1610).

After that, the home station determines whether or not the optical fiber 101 for reception by the home station is connected (in operation S1611). If the optical fiber 101 for reception by the home station is not connected (No in operation S1611), the process returns to operation S1610. If the optical fiber 101 for reception by the home station is connected (Yes in operation S1611), the process proceeds to operation S1612.

The reception format of the monitor signal of the home station is recovered (in operation S1612). Thus, the home station cancels transmission of the APSD request signal (APSD_Tx) to the other station and starts outputting the main signal to the other station (in operation S1613). Thus, the other station cancels the reception of the APSD request signal (APSD_Rx) and starts outputting the main signal to the home station (in operation S1614).

In the aforementioned first embodiment, the APSD switch 155 switches the first APSD controller 152 to the second APSD controller 135 during the update of the control program of the controller 132. Thus, the optical output power of the optical amplifiers 111 and 121 is quickly stopped upon the occurrence of a failure of the optical fiber 101, and the APSD switch 155 switches the second APSD controller 135 to the first APSD controller 152 so as to restore the operation after the restoration from the failure and the completion of the activation of the control program, and the signal communication may be automatically restored.

Second Embodiment

Figure 17:
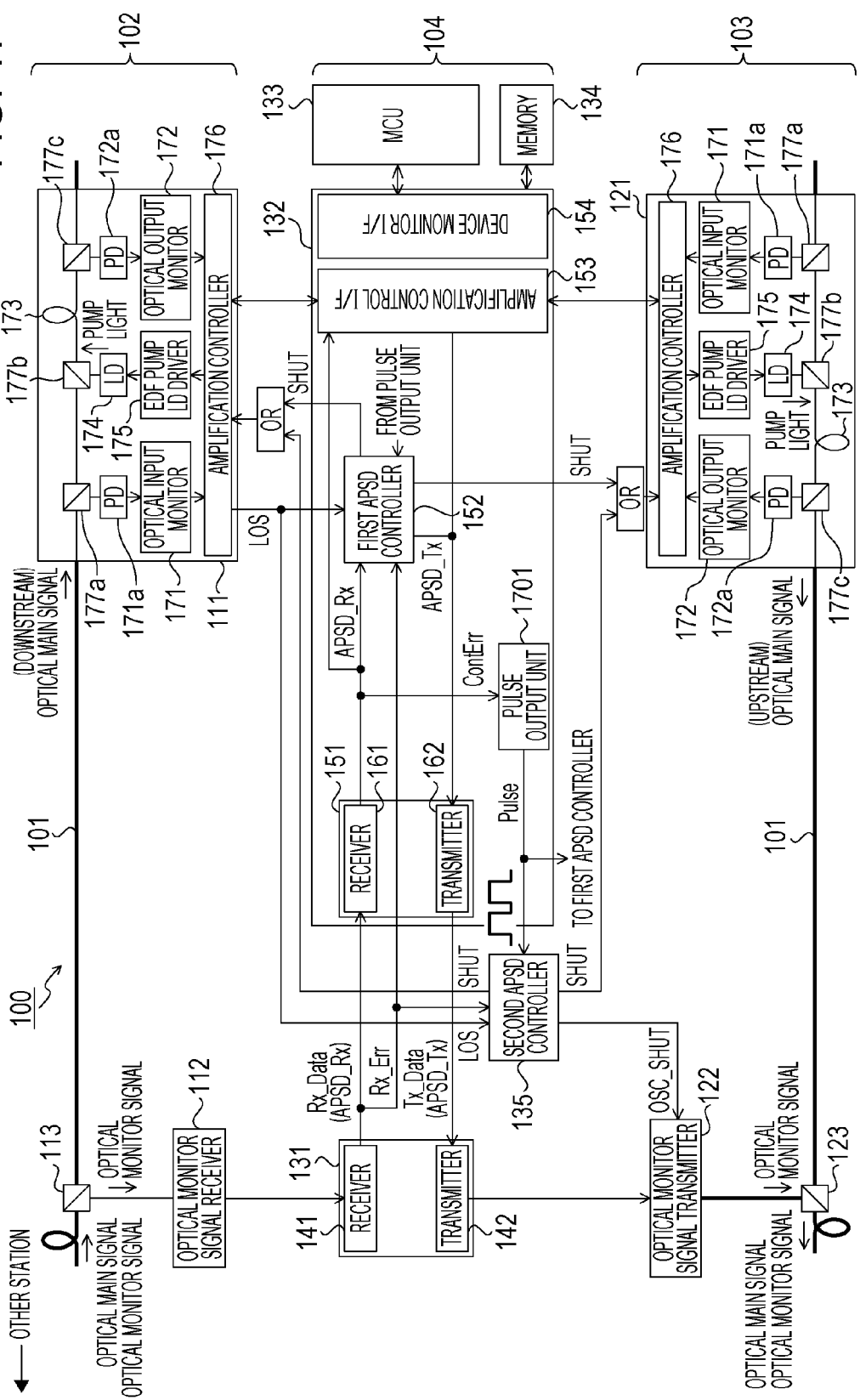
FIG. 17 is a block diagram illustrating the transmission device according to the second embodiment.

FIG. 17 is a block diagram illustrating the transmission device according to the second embodiment. In the second embodiment, the control program is updated without using the update start signal (UPGRD_ACT, UPGRD_ACT_Rx) signal indicating the start of the update of the control signal. Even if the control program is not executed due to an abnormality of the controller 132, the APSD control and the automatic restoration may be achieved in the same manner as the first embodiment.

The transmission device 100 illustrated in FIG. 17 includes the receiving unit 102, the transmitting unit 103, and the device control unit 104 in the same manner as the first embodiment (FIG. 1). In the second embodiment, the controller 132 of the device control unit 104 includes a pulse output unit 1701 as an error notifying unit that provides a notification that indicates that the controller 132 does not operate. When the controller 132 normally operates, the pulse output unit 1701 outputs a pulse (Pulse) with 1 ms cycle.

Figure 18:
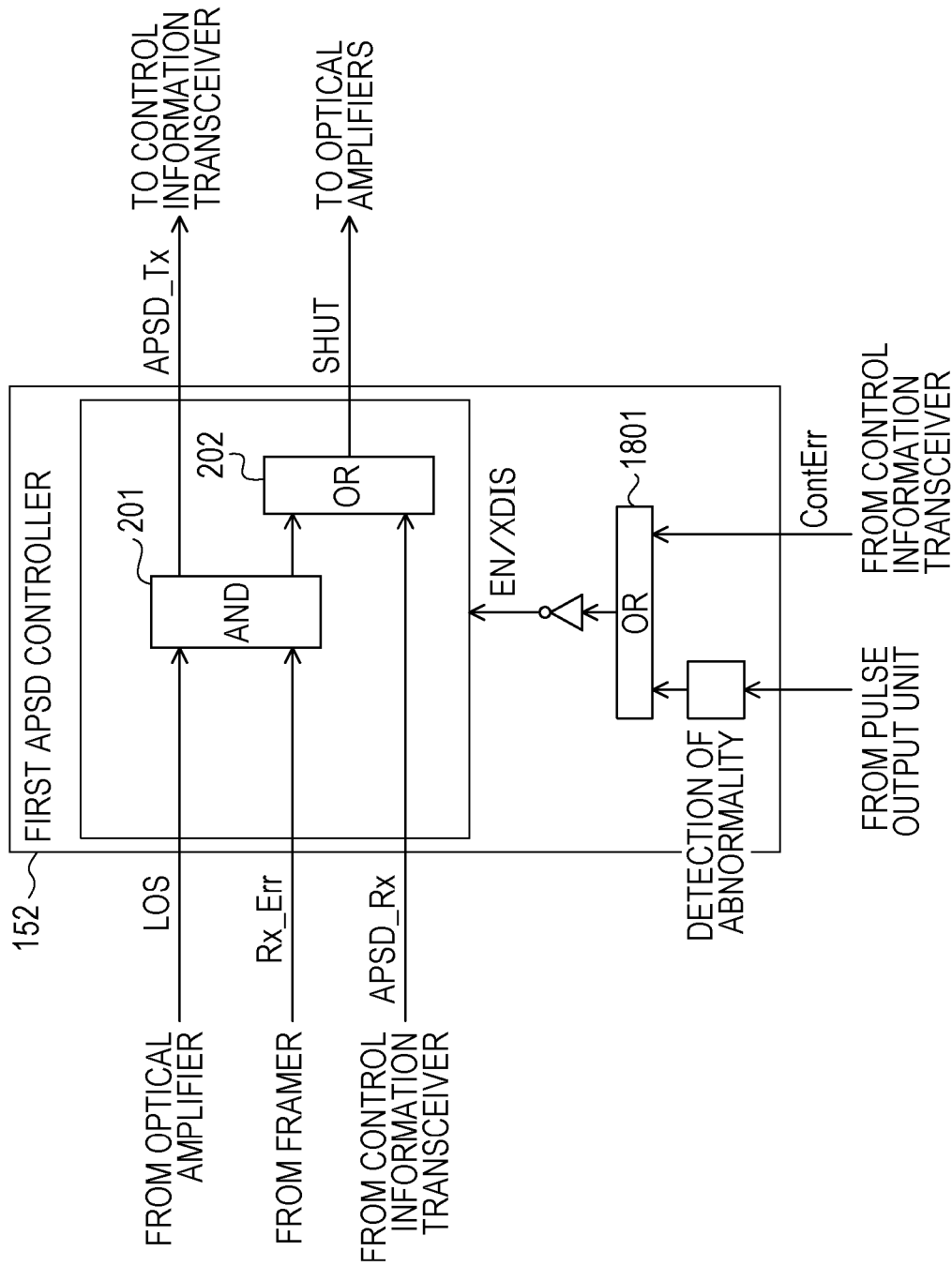
FIG. 18 is a diagram illustrating an example of an internal configuration of the first APSD controller.

FIG. 18 is a diagram illustrating an example of an internal configuration of the first APSD controller. The first APSD controller 152 has the same configuration as described in FIG. 2 and operates on the basis of an output of an OR circuit 1801, while the output of the OR circuit 1801 is a logical sum of the switch signal (APSD_ACT) output from the APSD switch 155 and the pulse output from the pulse output unit 1701. If the pulse output unit 1701 continues to output the pulse, the first APSD controller 152 determines that the controller 132 normally operates, and the first APSD controller 152 continues to operate. When the APSD switch 155 outputs the switch signal (APSD_ACT=1) or the output of the pulse from the pulse output unit 1701 is stopped, the first APSD controller 152 stops operating (and the operation of the first APSD controller 152 is switched to the second APSD controller 135).

The first APSD controller 152 detects the occurrence of a failure of the optical fiber 101 on the basis of the loss of signal indicating a reduction in the optical input power of the main signal and the format error signal (Rx_Err) indicating the error, detected by the framer 131, of the received signal. If detecting the occurrence of the failure of the optical fiber 101 or receiving the APSD request signal (APSD_Rx) through the optical monitor signal, the first APSD controller 152 outputs the SHUT signal to request the optical amplifiers 111 and 121 to stop the optical output power. If detecting the occurrence of the failure of the optical fiber 101, the first APSD controller 152 transmits the APSD request signal (APSD_Tx) to the other station in order to inhibit the optical output power from leaking from the transmission device 100 of the other station.

Figure 19:
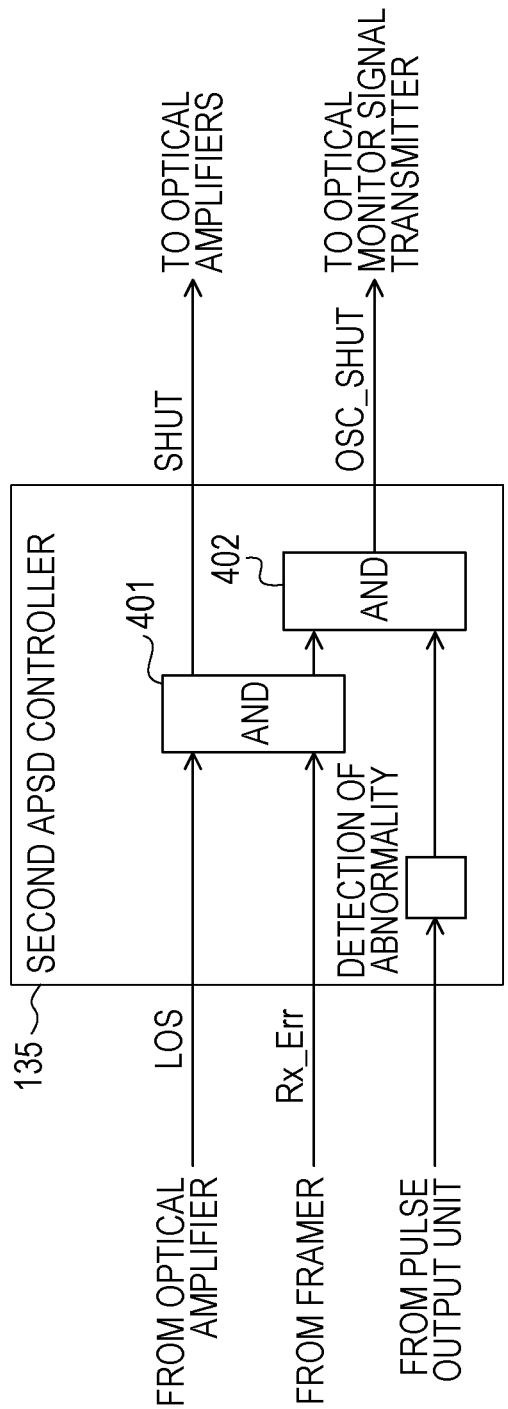
FIG. 19 is a diagram illustrating an example of an internal configuration of the second APSD controller.

FIG. 19 is a diagram illustrating an internal configuration of the second APSD controller. A signal to be input to the AND circuit 402 is different for the second APSD controller 135 and the second APSD controller 135 illustrated in FIG. 4 and described in the first embodiment. The pulse output from the pulse output unit 1701 is input to the AND circuit 402 instead of the switch signal (APSD_ACT) output from the APSD switch 155.

Thus, if the output of the pulse from the pulse output unit 1701 does not continue, the operation of the first APSD controller 152 is stopped and the second APSD controller 135 operates.

If the output of the pulse from the pulse output unit 1701 does not continue, the second APSD controller 135 illustrated in FIG. 19 detects the loss of signal (LOS) indicating a reduction in the optical input power of the main signal and the reception format error signal (Rx_Err) indicating the error, detected by the framer 131, of the received signal in the same manner as the first embodiment (FIG. 4). In this case, the second APSD controller 135 outputs the SHUT signal to stop the optical output power of the optical amplifiers 111 and 121 and the OSC_SHUT signal to stop the output of the optical monitor signal.

If the controller 132 does not normally operate due to the update of the control program or an abnormal operation of the controller 132, the control information transceiver 151 that generates the control information to be transmitted with the monitor signal does not operate, and whereby data that does not indicate the control information is transmitted to the other station. Thus, the other station may detect, on the basis of the received data, that the controller 132 of the station that transmits the monitor signal does not normally operate.

If the control information transceiver 151 determines that the controller 132 of the other station that transmits the monitor signal does not operate, the control information transceiver 151 outputs, to the pulse output unit 1701, a signal (ContErr) that indicates that the controller 132 of the other station is out of order. When receiving the signal (ContErr) indicating that the other station is out of order, the pulse output circuit 1701 stops operating. Thus, the first APSD controller 152 stops operating and is switched to the second APSD controller 135.

If the controller 132 does not operate, the second APSD controllers 135 that are included in the transmission devices 100 of the stations (home station and other station) operate. The home station and the other station are located on both sides of the optical fiber 101 through which the monitor signal is transmitted and received. If a failure occurs in the optical fiber 101, the second APSD controller 135 of the home station detects the loss of signal indicating a reduction in the optical input power of the main signal and the reception format error signal indicating the error of the monitor signal and stops the optical output power of the optical amplifiers 111 and 121 and the output of the optical monitor signal. The other station detects the loss of signal indicating a reduction in the optical input power of the main signal and the reception format error signal indicating the error of the monitor signal. In the transmission device 100 of the other station, the second APSD controller 135 operates and may detect the loss of signal indicating a reduction in the optical input power of the main signal and the reception format error indicating the error of the monitor signal and stop the optical output power of the optical amplifier 121.

For example, when the controller 132 completes the update of the control program and activates the control program, the output of the pulse output unit 1701 is restarted, and the second APSD controller 135 is switched to the first APSD controller 152. When the MCU 133 that monitors whether or not the control of the controller 132 is normal detects the update of the control program, the MCU 133 resets the controller 132 and restores the control program. Thus, when the controller 132 is activated, the output of the pulse from the pulse output unit 1701 is restarted, and the second APSD controller 135 is switched to the first APSD controller 152.

When the control program is executed and the second APSD controller 135 detects the output of the periodic pulse, the second APSD controller 135 outputs the signal (OSC_SHUT=0) indicating the cancellation of the stop of the output of the optical monitor signal and causes the optical monitor signal to be output. In this case, the control of stopping the optical output power of the optical amplifier 121 is transferred to the first APSD controller 152. Thus, if the loss of signal (LOS) indicating a reduction in the optical input power of the main signal and the reception format error signal (Rx_Err) indicating the error of the monitor signal continue to be output, the first APSD controller 152 outputs the signal (SHUT=1) to stop the optical output power of the optical amplifiers 111 and 121. When the control program is restored, the first APSD controller 152 outputs the signal (SHUT=0) that indicates the cancellation of the stop of the optical output power of the optical amplifiers 111 and 121.

When the restoration of the control program of the controller 132 is completed, the operation of the control information transceiver 151 is recovered and the control information transceiver 151 transmits the monitor signal including the control information to the other station. The other station determines, on the basis of the received control information, that the controller 132 of the station that transmits the monitor signal is restored, and the other station (opposing station) cancels the signal (ContErr) that is to be output to the pulse output unit 1701 and indicates that the controller 132 of the opposing station is out of order. When the signal (ContErr) that indicates that the controller 132 of the opposing station is out of order is cancelled, the pulse output unit 1701 restarts outputting the pulse so as to cause the first APSD controller 152 to operate.

The first APSD controller 152 receives the loss of signal (LOS) indicating a reduction in the optical input power of the main signal from the optical amplifier 121, the reception format error signal (Rx_Err) indicating the error of the monitor signal from the framer 131, and the logical signal of the signal (SHUT) to stop the optical output power of the optical amplifiers 111 and 121. In addition, the control information transceiver 151 that processes the control information of the monitor signal transmits and receives the APSD request signal (APSD_Rx, APSD_Tx) to and from the first APSD controller 152. Thus, the first APSD controller 152 has an advanced control function. The second APSD controller 135 only receives the loss of signal (LOS), the reception format error signal (Rx_Err), and the periodic pulse signal, outputs the SHUT signal to the optical amplifiers 111 and 121, and outputs, to the optical monitor signal transmitter 122, the signal (OSC_SHUT) that is the logical signal. Thus, the second APSD controller 135 may be configured with an inexpensive and simple logical circuit.

Figure 20:
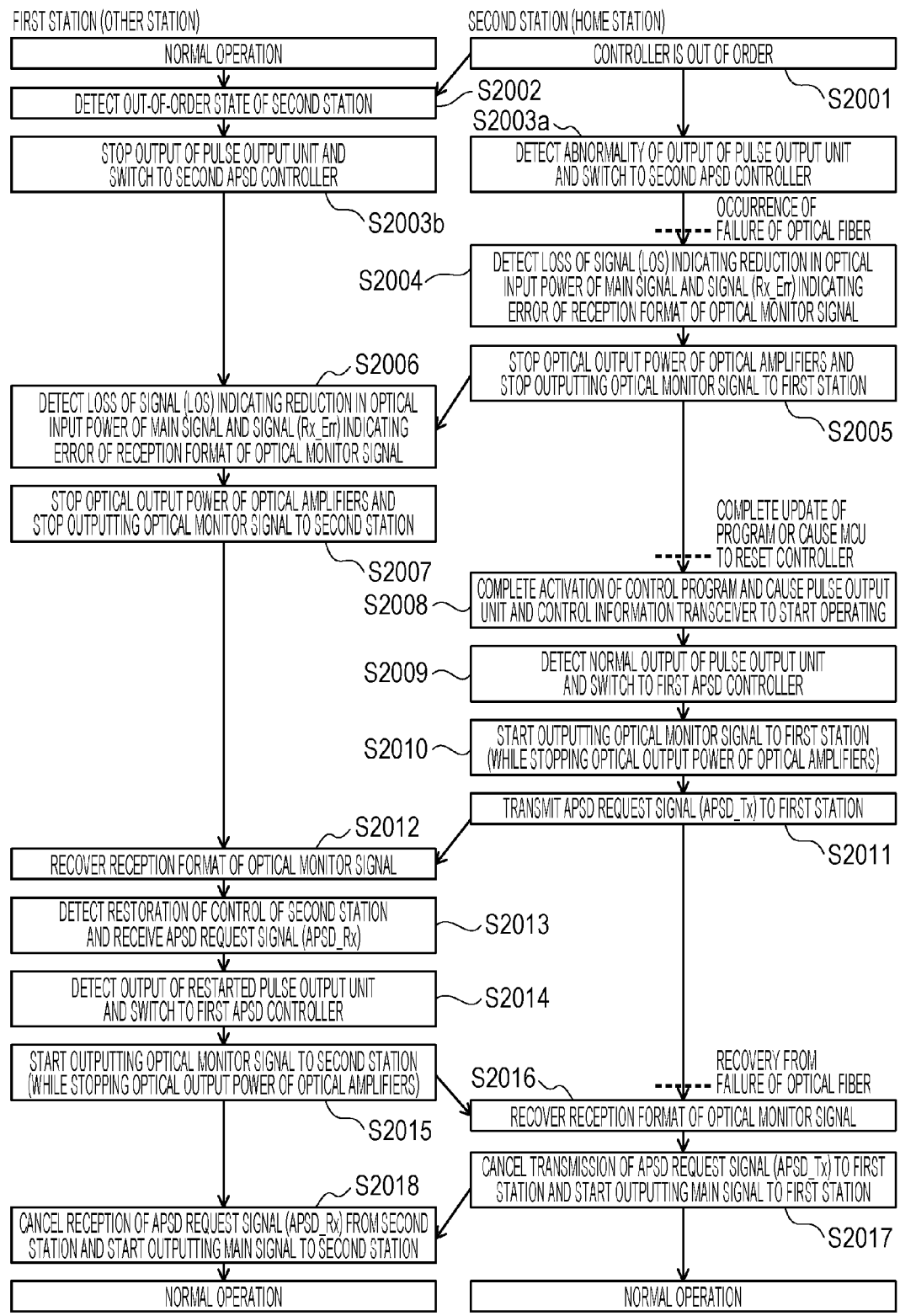
FIG. 20 is a sequence diagram illustrating an example of operations of the home station and operations of the other station if a failure occurs during the time when the home station is out of order.

Example of Operations to be Executed if Failure Occurs in Optical Fiber During Out-of-Order State of Home Station Next, the second embodiment describes operations that are executed if a failure occurs in the optical fiber 101 during the time when the control program of the transmission device 100 of the home station (second station) is not executed (or is out of order). FIG. 20 is a sequence diagram illustrating an example of operations of the home station and operations of the other station if the failure occurs during the time when the home station is out of order. The following process is described below: a process of detecting a failure of the downstream optical fiber 101 during the update of the control program of the controller 132 of the transmission device 100 of the home station (second station) or the occurrence of an abnormality of the control of the controller 132 and restoring the signal communication.

First, the controller 132 of the transmission device 100 of the home station (second station) stops operating due to the update of the program or an abnormality of the control of the controller 132 (in operation S2001), and whereby the control information transceiver 151 of the second station may not operate. Thus, the first station detects that data received from the second station is abnormal and that the second station (controller 132) is out of order (in operation S2002). In the second station, the output of the pulse output unit 1701 becomes abnormal due to the out-of-order state of the controller 132, and the first APSD controller 152 is switched to the second APSD controller 135 (in operation S2003a). The first station determines the out-of-order state of the controller 132 of the second station, stops the pulse output unit 1701, and switches the first APSD controller 152 to the second APSD controller 135 (in operation S2003b).

It is assumed that when the controller 132 of the second station is out of order, the failure occurs in the downstream optical fiber 101. Based on this assumption, the second APSD controller 135 of the second station detects the loss of signal (LOS) indicating a reduction in the optical input power of the main signal and the reception format error signal (Rx_Err) indicating the error of the monitor signal and determines the occurrence of the failure of the optical fiber 101 (in operation S2004). Then, the second APSD controller 135 of the second station outputs the SHUT signal to stop the optical output power of the optical amplifiers 111 and 121 and outputs the OSC_SHUT signal to stop the output of the optical monitor signal to the first station (in operation S2005).

Thus, the second APSD controller of the first station detects the loss of signal (LOS) indicating a reduction in the optical input power of the main signal and the reception format error signal (Rx_Err) indicating the error of the monitor signal (in operation S2006). Then, the second APSD controller 135 of the first station outputs the SHUT signal to stop the optical output power of the optical amplifier 121 so as not to cause the optical power to leak from the location 501 of the optical fiber 101 and outputs the OSC_SHUT signal to stop the output of the optical monitor signal to the second station (in operation S2007).

In the second station in which the controller 132 is out of order, when the update of the control program is completed or the MCU 133 resets the controller 132 so as to restore the controller 132 and the activation of the control program is completed, the pulse output unit 1701 and control information transceiver 151 of the controller 132 start operating (in operation S2008). When the second APSD controller 135 of the second station detects the normal operation of the pulse output unit 1701 of the controller 132 of the second station, the second APSD controller 135 is switched to the first APSD controller 152 (in operation S2009).

After detecting the normal operation of the pulse output unit 1701, the second APSD controller 135 of the second station outputs, to the first station, the signal (OSC_SHUT=0) to cancel the stop of the output of the optical monitor signal and causes the optical monitor signal to be output. In this case, the optical fiber 101 is yet to be restored from the failure, and whereby the second APSD controller 135 of the second station detects the loss of signal (LOS) indicating a reduction in the optical input power of the main signal and the reception format error signal (Rx_Err) indicating the error of the monitor signal, and the output of the optical power from the optical amplifier 121 remains stopped (in operation S2010). Since the second station detects the loss of signal (LOS) indicating a reduction in the optical input power of the main signal and the reception format error signal (Rx_Err) indicating the error of the monitor signal, the second station transmits the APSD request signal (APSD_Tx) to the first station (in operation S2011).

Since the upstream optical monitor signal is communicated, the first station cancels the reception format error signal (Rx_Err) indicating the error of the received monitor signal (recovery of the reception format in operation S2012). Then, the first station detects the restoration of the control of the second station and receives the APSD request signal (APSD_Rx) (in operation S2013). The first station restarts the operation of the pulse output unit 1701 and switches the second APSD controller 135 to the first APSD controller 152 by detecting the restoration of the control of the second station (in operation S2014). In addition, the second APSD controller 135 of the first station detects the normal operation of the pulse output unit 1701, outputs, to the second station, the signal (OSC_SHUT=0) to cancel the stop of the output of the optical monitor signal, and causes the optical monitor signal to be output (in operation S2015).

When the downstream optical fiber 101 is recovered from the failure, the downstream optical monitor signal is communicated and the second station cancels the reception format error signal (Rx_Err) indicating the error of the monitor signal (recovery of the reception format in operation S2016). Then, the second station cancels transmission of the APSD request signal (APSD_Tx) to the first station and starts outputting the main signal to the first station (in operation S2017). The first station cancels reception of the APSD request signal (APSD_Rx) from the second station and starts outputting the main signal to the second station (in operation S2018).

Figure 21:
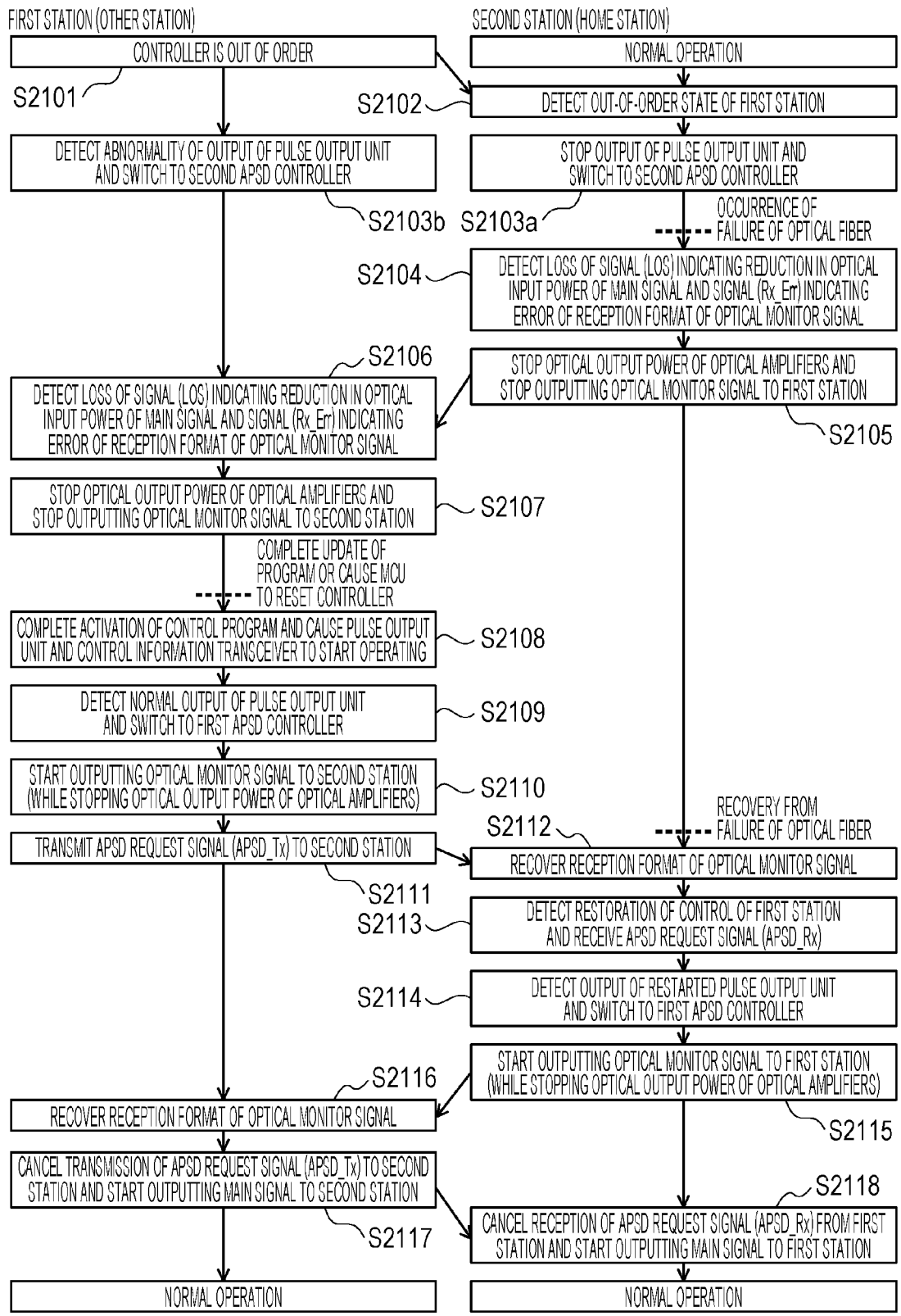
FIG. 21 is a sequence diagram illustrating an example of operations of the home station and operations of the other station if a failure occurs during the time when the other station is out of order.

Example of Operations to be Executed if Failure Occurs in Optical Fiber During Out-of-Order State of Other Station Next, the second embodiment describes operations that are executed if a failure occurs in the optical fiber 101 during the time when the control program of the transmission device 100 of the other station (first station) is not executed (or is out of order). FIG. 21 is a sequence diagram illustrating an example of operations of the home station and other station if a failure occurs in the optical fiber 101 during the time when the other station is out of order. The following process is described: a process of detecting a failure of the downstream optical failure 101 upon the update of the control program of the controller 132 of the transmission device 100 of the other station (first station) or an abnormality of the control of the controller 132 and restoring the signal communication.

First, when the controller 132 of the transmission device 100 of the other station (first station) does not operate due to the update of the control program or an abnormality of the control of the controller 132 (in operation S2101), the control information transceiver 151 of the controller 132 of the first station does not operate. Thus, if the second station detects that data received from the first station is abnormal, the second station determines that the controller 132 of the first station is out of order (in operation S2102). Then, the output of the pulse output unit 1701 of the first station is abnormal due to the out-of-order state of the controller 132, and the first station switches the first APSD controller 152 to the second APSD controller 135 (in operation S2103b). The second station determines that the controller 132 of the first station is out of order, and the second station stops the pulse output unit 1701 and switches the first APSD controller 152 to the second APSD controller 135 (in operation S2103a).

It is assumed that a failure occurs in the downstream optical fiber 101 during the out-of-order state of the controller 132 of the first station. Based on this assumption, the second APSD controller 135 of the second station detects the loss of signal (LOS) indicating a reduction in the optical input power of the main signal and the reception format error signal (Rx_Err) indicating the error of the monitor signal and detects the occurrence of the failure of the optical fiber 101 (in operation S2104). Then, the second APSD controller 135 of the first station outputs the SHUT signal to stop the optical output power of the optical amplifiers 111 and 121 and outputs the OSC_SHUT signal to stop the output of the optical monitor signal to the first station (in operation S2105).

Then, the second APSD controller 135 of the first station detects the loss of signal (LOS) indicating a reduction in the optical input power of the main signal and the reception format error signal (Rx_Err) indicating the error of the monitor signal (in operation S2106). After that, the second APSD controller 135 of the first station outputs the SHUT signal to stop the output of the optical amplifier 121 in order to inhibit the optical power from leaking from the failure location 501 of the optical fiber 101 and outputs the OSC_SHUT signal to stop the output of the optical monitor signal to the second station (in operation S2107).

In the first station in which the controller 132 is out of order, when the control program is completely activated after the update of the control program is completed or the controller 132 is reset and restored by the MCU 133, the pulse output unit 1701 and the control information transceiver 1151 that are included in the controller 132 of the first station start operating (in operation S2108). When the second APSD controller 135 detects the normal operation of the pulse output unit 1701 of the controller 132 of the first station, the second APSD controller 135 is switched to the first APSD controller 152 (in operation S2109).

When detecting the normal operation of the pulse output unit 1701, the second APSD controller 135 of the first station outputs, to the second station, the signal (OCS_SHUT=0) to cancel the stop of the output of the optical monitor signal and causes the optical monitor signal to be output. In this case, the optical output power of the optical amplifier 121 of the second station and the output of the optical monitor signal remain stopped, and whereby the second APSD controller 135 of the first station detects the loss of signal (LOS) indicating a reduction in the optical input power of the main signal and the reception format error signal (Rx_Err) indicating the error of the monitor signal, and the output of the optical power from the optical amplifier 121 remains stopped (in operation S2110). Since the loss of signal (LOS) indicating a reduction in the optical input power of the main signal and the reception format error signal (Rx_Err) indicating the error of the monitor signal are detected by the first station, the second APSD controller 135 of the first station transmits the APSD request signal (APSD_Tx) to the second station (in operation S2111).

When the downstream optical fiber 101 is recovered from the failure, the optical monitor signal is communicated from the first station to the second station. Thus, the second station cancels the reception format error signal (Rx_Err) indicating the error of the monitor signal (recovery of the reception format in operation S2112). Thus, the second station detects the restoration of the control of the first station and receives the APSD request signal (APSD_Rx) (in operation S2113). Then, the second station restarts the operation of the pulse output unit 1701 and switches the second APSD controller 135 to the first APSD controller 152 by detecting the restoration of the control of the first station (in operation S2114).

When detecting the normal operation of the pulse output unit 1701, the second APSD controller 135 of the second station outputs, to the first station, the signal (OSC_SHUT=0) to cancel the stop of the output of the optical monitor signal and causes the optical monitor signal to be output (in operation S2115). Since the upstream optical monitor signal is communicated, the first station cancels the reception format error signal (Rx_Err) indicating the error of the monitor signal (recovery of the reception format in operation in S2116). Then, the first station cancels the transmission of the APSD request signal (APSD_Tx) to the second station and starts outputting the main signal to the second station (in operation S2117). The second station cancels the reception of the APSD request signal (APSD_Rx) from the first station and starts outputting the main signal to the first station (in operation S2118).

Figure 22:
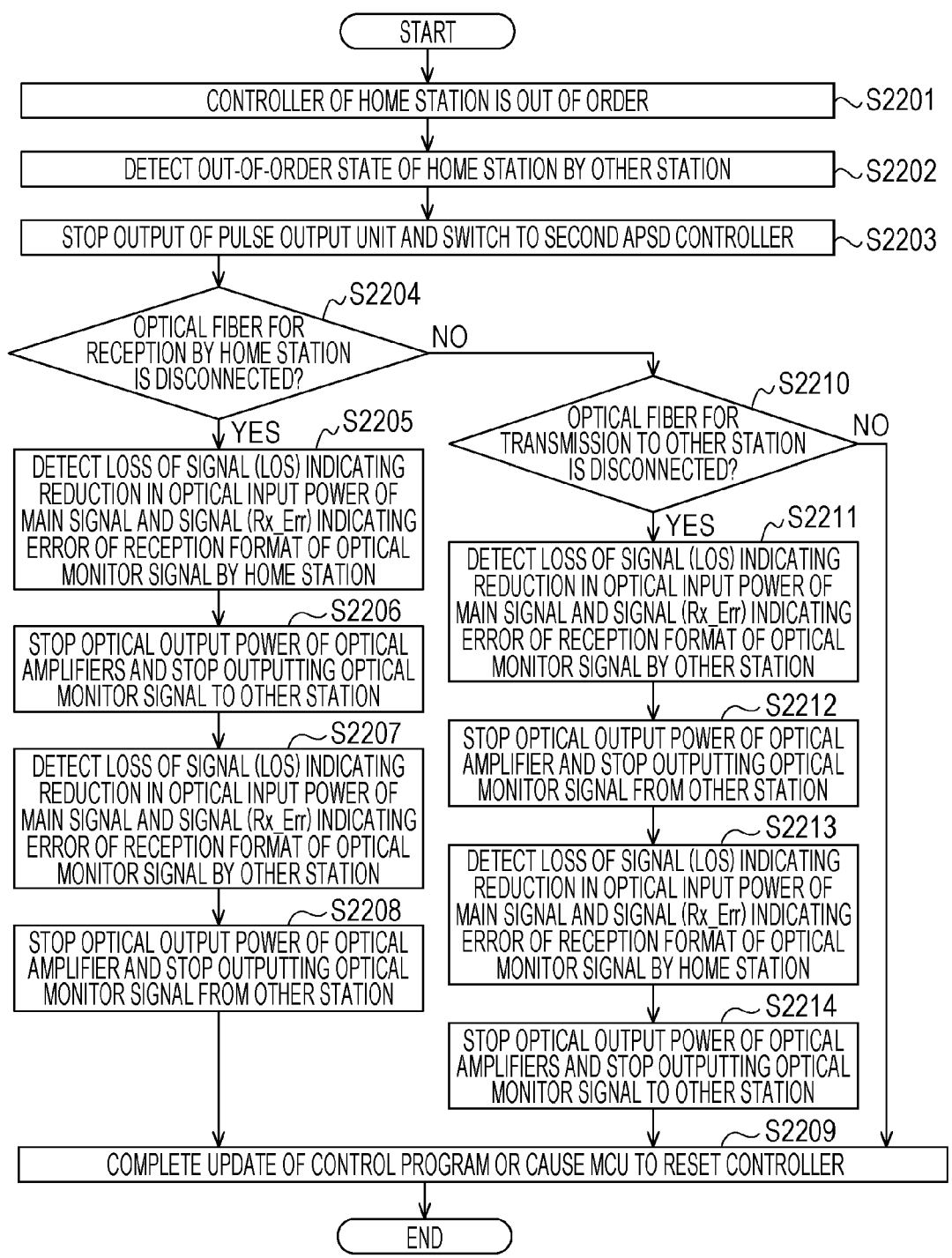
FIG. 22 is a flowchart of a process that is executed if a failure occurs during the time when the home station is out of order according to the second embodiment.

FIG. 22 is a flowchart of a process that is executed if a failure occurs during the out-of-order state of the controller according to the second embodiment. FIG. 22 illustrates the contents of the process that is executed by the transmission device 100 (illustrated in FIG. 17) of the home station (second station) for a time period from the occurrence of the failure to the stop of the optical power.

When the controller 132 of the transmission device 100 of the first station (second station) becomes out of order (in operation S2201), the other station (first station) detects the out-of-order state of the home station (second station) (in operation S2202). Thus, in each of the home station and the other station, the APSD switch 155 outputs the switch signal (APSD_ACT=1) so as to switch the operation from the first APSD controller 152 arranged in the controller 132 to the second APSD controller 135 arranged outside the controller 132 (in operation S2203).

After that, the second APSD controller 135 determines whether or not the optical fiber 101 for reception by the home station is disconnected (in operation S2204). If the optical fiber 101 for reception by the home station is disconnected (Yes in operation S2204), the process proceeds to operation S2205. If the optical fiber 101 for reception by the home station is not disconnected (No in operation S2204), the process proceeds to operation S2210.

The second APSD controller 135 of the home station detects the loss of signal (LOS) indicating a reduction in the optical input power of the main signal and the reception format error signal (Rx_Err) indicating the error of the monitor signal (in operation S2205). Thus, the second APSD controller 135 stops the optical output power of the optical amplifiers 111 and 121 and causes the optical monitor signal to be output (in operation S2206).

Thus, the other station detects the loss of signal (LOS) indicating a reduction in the optical input power of the main signal and the reception format error signal (Rx_Err) indicating the error of the monitor signal (in operation S2207). Then, the other station stops the optical output power of the optical amplifier 121 and stops outputting the optical monitor signal to the home station (in operation S2208). After that, the update of the control program is completed or the MCU 133 resets the controller 132 (in operation S2209).

The second APSD controller 135 determines whether or not the optical fiber 101 for transmission to the other station is disconnected (in operation S2210). If the optical fiber 101 for transmission to the other station is disconnected (Yes in operation S2210), the process proceeds to operation S2211. If the optical fiber 101 for transmission to the other station is not disconnected (No in operation S2210), the process proceeds to operation S2209.

The second APSD controller 135 detects the loss of signal (LOS) indicating a reduction in the optical input power of the main signal and the reception format error signal (Rx_Err) indicating the error of the monitor signal (in operation S2211). Thus, the other station stops the optical output power of the optical amplifier 121 and stops outputting the optical monitor signal to the home station (in operation S2212).

After that, the home station detects the loss of signal (LOS) indicating a reduction in the optical input power of the main signal and the reception format error signal (Rx_Err) indicating the error of the monitor signal (in operation S2213). Thus, the home station stops the optical output power of the optical amplifiers 111 and 121 and stops outputting the optical monitor signal to the other station (in operation S2214). After that, the update of the control program is completed or the MCU 133 resets the controller 132 (in operation S2209).

Figure 23:
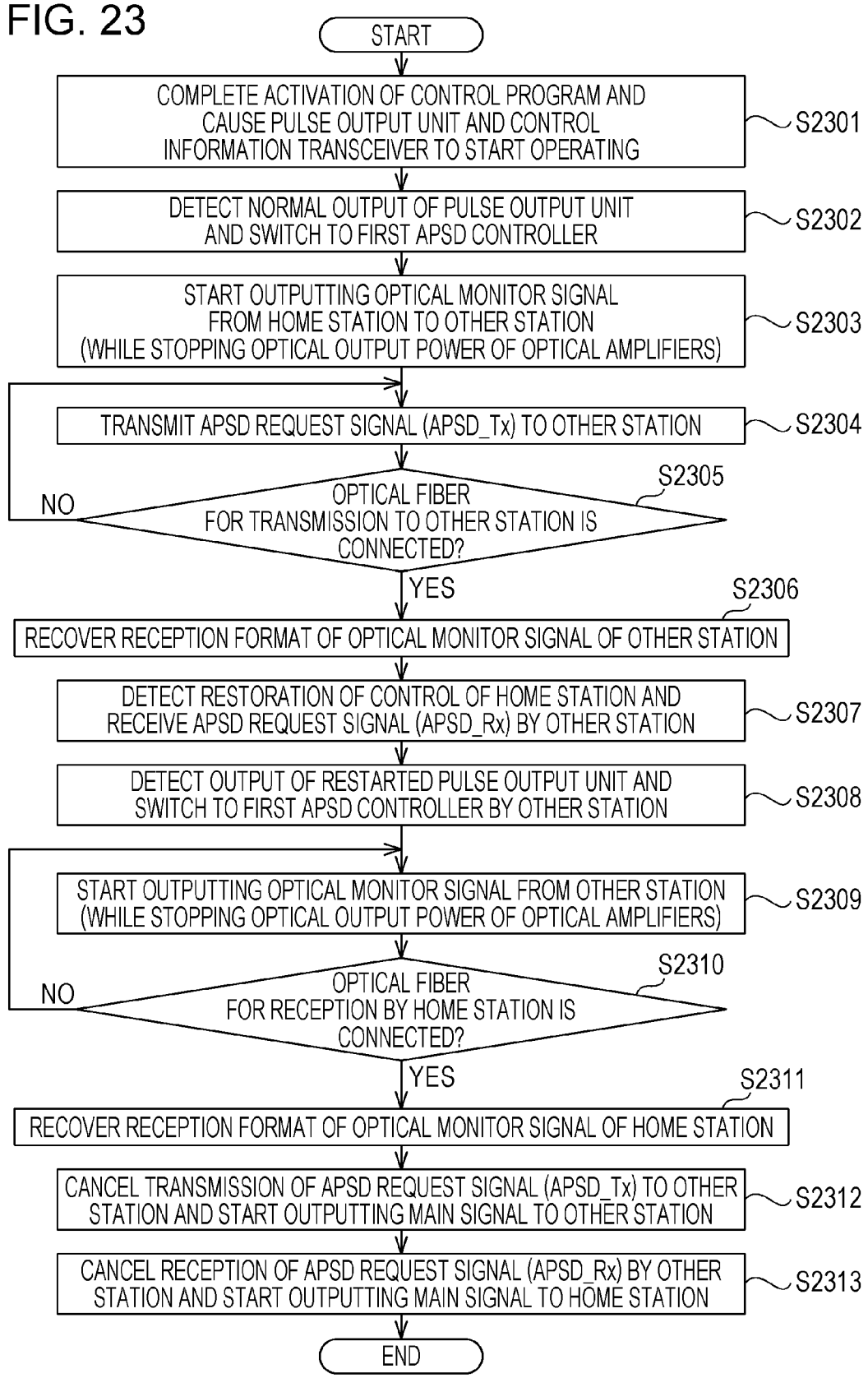
FIG. 23 is a flowchart of a process that is executed after restoration from a failure according to the second embodiment.

FIG. 23 is a flowchart of a process that is executed after the restoration from the failure according to the second embodiment. FIG. 23 illustrates the process that is executed after the process illustrated in FIG. 22. First, the controller 132 of the home station completes the activation of the control program, and the pulse output unit 1701 and control information transceiver 151 of the controller 132 of the home station start operating (in operation S2301). Then, the APSD switch 155 of the home station detects the normal output of the pulse output unit 1701 and outputs the switch signal (APSD_ACT=0) so as to switch the second APSD controller 135 to the first APSD controller 152 and restore the operation (in operation S2302). Thus, the home station starts outputting the optical monitor signal to the other station, while the optical output power of the optical amplifier 121 remains stopped (in operation S2303). After that, the home station transmits the APSD request signal (APSD_Tx) to the other station (in operation S2304).

After that, the home station determines whether or not the optical fiber 101 for transmission to the other station is connected (in operation S2305). If the optical fiber 101 for transmission to the other station is not connected (No in operation S2305), the process returns to operation S2304. If the optical fiber 101 for transmission to the other station is connected (Yes in operation S2305), the process proceeds to operation S2306.

The reception format of the monitor signal of the other station is recovered (in operation S2306). Thus, the other station detects the restoration of the control of the home station and receives the APSD request signal (APSD_Rx) (in operation S2307). Then, the other station detects the output from the restarted pulse output unit 1701, and the APSD switch 155 of the other station outputs the switch signal (APSD_ACT=0) so as to switch the second APSD controller 135 to the first APSD controller 152 and restore the operation (in operation S2308). Thus, the other station starts outputting the optical monitor signal, and the optical output power of the optical amplifier 121 remains stopped (in operation S2309).

After that, the home station determines whether or not the optical fiber 101 for reception by the home station is connected (in operation S2310). If the optical fiber 101 for reception by the home station is not connected (No in operation S2310), the process returns to operation S2309. If the optical fiber 101 for reception by the home station is connected (Yes in operation S2310), the process proceeds to operation S2311.

The reception format of the monitor signal of the home station is recovered (in operation S2311). Thus, the home station cancels transmission of the APSD request signal (APSD_Tx) to the other station and starts outputting the main signal to the other station (in operation S2312). Thus, the other station cancels the reception of the APSD request signal (APSD_Rx) and starts outputting the main signal to the home station (in operation S2313).

In the aforementioned second embodiment, even when the control program is not executed due to the update of the control program or an abnormality of the control of the controller 132, the APSD controllers 135 and 152 are switched by the signal that indicates the out-of-order state of the controller 132. Thus, if a failure occurs in the optical fiber 101 when the first APSD controller 152 does not operate due to the out-of-order state of the controller 132, the first APSD controller 152 is switched to the second APSD controller 135. Thus, the output of the high optical power from the optical amplifiers 111 and 121 to the optical fiber 101 may be stopped, and whereby the optical power may be inhibited from leaking from the failure location 501. In addition, the signal communication may be automatically restored from the failure by switching the second APSD controller 135 to the original first APSD controller 152 after the restoration from the failure and the completion of the activation of the control program. Thus, the signal communication may be automatically restored in a safe manner without a cumbersome task by an operator.

In the aforementioned first and second embodiments, the amplification controllers 176 that are included in the optical amplifiers 111 and 121 compare the optical input power of the main signal with given optical power such as power detected upon a disconnection such as a disconnection of the optical fiber 101 and output the loss of signal (LOS) indicating a reduction in the optical input power of the main signal. However, the amplification controllers 176 may not compare the optical power upon the update of control programs of the amplification controllers 176. Thus, for the comparison of the optical power, voltages of the optical power that are monitored by the optical input monitors 171 are compared with a reference voltage corresponding to the given optical power such as power detected upon a disconnection of the optical fiber 101. If the monitored voltages are smaller than the reference voltage, comparators that output logical signals or the like may be arranged outside the amplification controllers 176.

Third Embodiment

Figure 24:
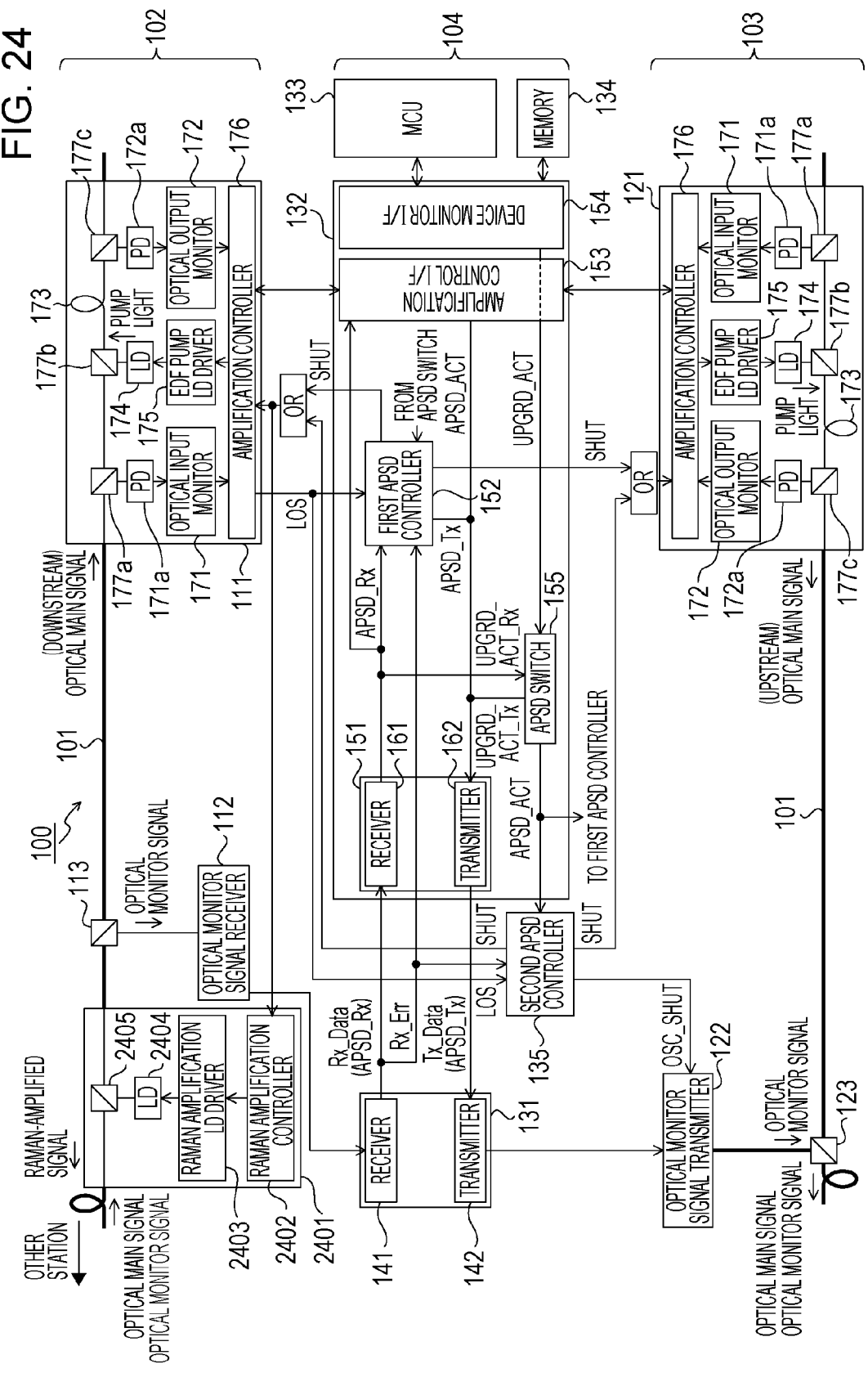
FIG. 24 is a block diagram illustrating the transmission device according to the third embodiment.

FIG. 24 is a block diagram illustrating the transmission device according to the third embodiment. The transmission device 300 according to the third embodiment is configured by adding a Raman amplifier 2401 as an optical amplifier to the configuration (illustrated in FIG. 1) according to the first embodiment. The Raman amplifier 2401 is arranged on the optical transmission path (optical fiber 101). The Raman amplifier 2401 may be integrated with the transmission device 100 or separated from the transmission device 100.

The Raman amplifier 2401 includes a Raman amplification controller 2402, a Raman amplification LD driver 2403, a laser diode (LD) 2404, and a multiplexer 2405. In the example illustrated in FIG. 24, backward pumping is executed. Forward pumping may be executed, or a combination of the backward pumping and the forward pumping may be executed. The SHUT signal to stop the optical output power is input to the Raman amplification controller 2402 from the controller 132. Thus, the Raman amplifier 2401 and the optical amplifiers 111 and 121 may be synchronized with each other and control the optical output power in the same manner as the first embodiment.

Fourth Embodiment

Figure 25:
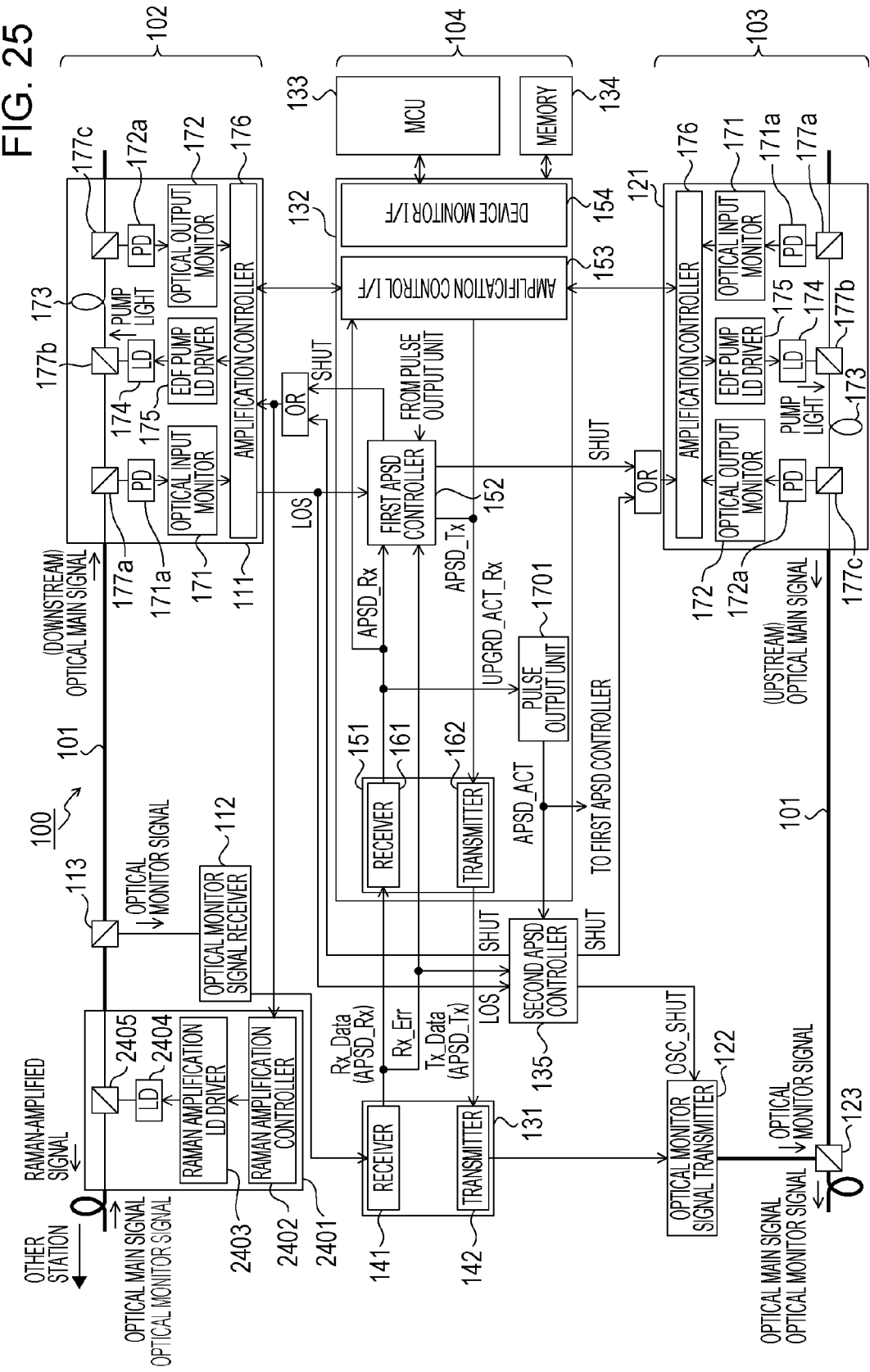
FIG. 25 is a block diagram illustrating the transmission device according to the fourth embodiment.

FIG. 25 is a block diagram illustrating the transmission device according to the fourth embodiment. The transmission device 100 according to the fourth embodiment is configured by adding the Raman amplifier 2401 to the configuration (illustrated in FIG. 17) according to the second embodiment. The Raman amplifier 2401 is arranged on the optical transmission path (optical fiber 101). In the fourth embodiment, the Raman amplifier 2401 and the optical amplifiers 111 and 121 may be synchronized with each other and control the optical output power.

In the third and fourth embodiments, the Raman amplifier 2401 may be arranged without the optical amplifiers 111 and 121.

In each of the first to fourth embodiments, the transmission device 100 may has a function of automatically shutting down the optical power on the basis of a failure. The transmission device 100 that has this function includes the first APSD controller 152 and the second APSD controller 135. The first APSD controller 152 operates during the normal operation. The second APSD controller 135 operates when the controller 132 does not operate due to the update of the control program or an abnormality of the control during the time when the transmission device 100 operates. When detecting a failure of the optical fiber 101, the first APSD controller 152 outputs the signal to request the stop of the optical output power of the optical amplifiers 111 and 121 to the monitor signal. When a failure of the optical fiber 101 is detected or the signal to request the stop of the optical output power of the optical amplifiers 111 and 121 is received through the monitor signal, the optical output power of the optical amplifiers 111 and 121 is stopped. When detecting a failure of the optical fiber 101, the second APSD controller 135 stops the optical output power of the optical amplifiers 111 and 121 and the output of the optical monitor signal.

During the update of the control program of the controller 132, the APSD request signal is not transmitted and received using the monitor signal and the first APSD controller 152 does not execute the APSD control. Thus, when the control program of the controller 132 starts to be updated, the first APSD controller 152 is switched to the second APSD controller 135. Then, the home station transmits the monitor signal with the signal indicating the start of the update of the control program of the controller 132 to the transmission device 100 of the other station and causes the other station to switch the first APSD controller 152 of the other station to the second APSD controller 135 of the other station.

When the controller 132 becomes out of order due to the update of the control program or an abnormality of the control, the APSD request signal is not transmitted and received using the monitor signal, and the first APSD controller 152 does not execute the APSD control. Thus, when the out-of-order state of the controller 132 is detected, the first APSD controller 152 is switched to the second APSD controller 135. In addition, when the out-of-order state of the controller 132 of the other station is detected, the first APSD controller 152 is switched to the second APSD controller 135 by detecting an abnormality of the control information received from the monitor signal.

When the controller 143 does not operate due to the update of the control program or an abnormality of the control during the time when the transmission device 100 operates, and a failure of the optical fiber 101 is detected, the second APSD controllers 135 operate in the transmission devices 100 that oppose each other. Thus, the transmission devices 100 stop the optical output power and stop outputting the optical monitor signal. Thus, the leakage of the optical signal from a failure location may be immediately stopped. In addition, the signal communication may be automatically restored from the failure by switching to the first APSD controllers 152 after the restoration from the failure and the activation of the control program. Thus, the signal communication may be automatically restored from the failure in a safe manner without a cumbersome task by an operator, and the security of the transmission devices 100 and the efficiency of maintenance may be improved.

The control program described in the aforementioned embodiments may be achieved by causing a computer to execute a prepared program. In addition, the prepared program is stored in a computer-readable recording medium such as a hard disk, a flexible disk, a CD-ROM, an MO, or a DVD. The program is read from the recording medium and thereby executed. The program may be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission device comprising:
    an optical amplifier configured to amplify an optical main signal to be transmitted on an optical transmission path;
    a first controller configured to stop output of the optical amplifier and output of an optical monitor signal to be transmitted on the optical transmission path when a failure of the optical transmission path is detected;
    a second controller configured to be switched from the first controller and configured to operate and stop the output of the optical amplifier and the output of the optical monitor signal when the failure of the optical transmission path is detected;
    an optical monitor signal transceiver configured to transmit and receive the optical monitor signal including control information; and
    a switch configured to switch an operation from the first controller to the second controller, based on information of the failure of the optical transmission path based on the states of transmission and reception of the optical monitor signal.

2. The transmission device according to claim 1, wherein the first controller requests, based on the control information, to stop outputting the optical main signal of the transmission device of other station when the failure of the optical transmission path is detected.

3. The transmission device according to claim 1, wherein when an optical power of the optical main signal is smaller than a specific optical power and a data format of the control information included in the optical monitor signal is abnormal, the first controller and the second controller determine the failure of the optical transmission path.

4. The transmission device according to claim 1, further comprising:
    a memory configured to store a control program of the first controller; and
    a processor configured to update the control program of the first controller,
    wherein the switch switches the operation from the first controller to the second controller when an update of the control program is started, and
    wherein the control information that includes information indicating a start of an update of the control program is transmitted to the transmission device of other station.

5. The transmission device according to claim 4,
    wherein the switch switches the operation from the second controller to the first controller when the update of the control program is completed, and
    wherein the control information that includes information indicating a completion of the update of the control program is transmitted to the transmission device of other station.

6. The transmission device according to claim 4, wherein the switch switches the operation from the first controller to the second controller, based on information that indicates the start of the update of a control program of the transmission device of other station and is included in the control information received from the transmission device of other station.

7. The transmission device according to claim 6, wherein the switch switches the operation from the second controller to the first controller, based on information that indicates the completion of the update of the control program of the transmission device of other station and is included in the control information received from the transmission device of other station.

8. The transmission device according to claim 1, wherein the switch switches the operation from the first controller to the second controller upon an abnormality of the first controller, and transmits, to the transmission device of other station, the control information that includes information indicating the operational abnormality of the transmission device of a home station.

9. The transmission device according to claim 8, wherein the switch outputs a periodic pulse during a normal operation and switches between the first controller and the second controller, based on whether or not an output state of the pulse is normal.

10. The transmission device according to claim 8, wherein the switch switches the operation from the first controller to the second controller, based on information that indicates an operational abnormality of a first controller of the transmission device of other station and is included in the control information received from the transmission device of other station.

11. The transmission device according to claim 8, wherein the switch switches the operation from the second controller to the first controller on the basis of information that indicates a normal recovery of an operational state of the first controller of the transmission device of other station and is included in the control information received from the transmission device of other station.

12. The transmission device according to claim 1, wherein the optical amplifier is an erbium doped fiber amplifier.

13. The transmission device according to claim 1, wherein the optical amplifier is a Raman amplifier.

14. A transmission system comprising:
    a transmission device of a first station; and
    a transmission device of a second station wherein the transmission devices are arranged adjacent to each other on an optical transmission path, wherein each of the transmission devices includes:

an optical amplifier configured to amplify an optical main signal to be transmitted on an optical transmission path;

a first controller configured to stop output of the optical amplifier and output of an optical monitor signal to be transmitted on the optical transmission path when a failure of the optical transmission path is detected;

a second controller configured to be switched from the first controller and configured to operate and stop the output of the optical amplifier and the output of the optical monitor signal when the failure of the optical transmission path is detected;

an optical monitor signal transceiver configured to transmit and receive the optical monitor signal including control information; and a switch configured to switch an operation from the first controller to the second controller, based on information of the failure of the optical transmission path based on the states of transmission and reception of the optical monitor signal.

15. The transmission system according to claim 14, wherein the first controller requests, based on the control information, to stop outputting the optical main signal of the transmission device of other station when the failure of the optical transmission path is detected.

* * * * *